US012119573B2

(12) United States Patent
Kim et al.

(10) Patent No.: US 12,119,573 B2
(45) Date of Patent: Oct. 15, 2024

(54) SYSTEM AND METHOD FOR OPERATING AN APERTURE-COUPLED TUNABLE RING ANTENNA SYSTEM WITH A DETACHABLE METAL KEYBOARD AND INTEGRATED DUAL OPPOSITE OUTLET THERMAL VENT

(71) Applicant: Dell Products, LP, Round Rock, TX (US)

(72) Inventors: Changsoo Kim, Cedar Park, TX (US); Suresh K. Ramasamy, Cedar Park, TX (US); Allen B. McKittrick, Cedar Park, TX (US); Christopher T. Barnard, Austin, TX (US)

(73) Assignee: DELL PRODUCTS LP, Round Rock, TX (US)

(*) Notice: Subject to any disclaimer, the term of this patent is extended or adjusted under 35 U.S.C. 154(b) by 397 days.

(21) Appl. No.: 17/333,111

(22) Filed: May 28, 2021

(65) Prior Publication Data

US 2022/0382327 A1 Dec. 1, 2022

(51) Int. Cl.

| | |
|---|---|
| ***H01Q 1/12*** | (2006.01) |
| ***H01Q 1/20*** | (2006.01) |
| ***H01Q 1/22*** | (2006.01) |
| ***H01Q 1/52*** | (2006.01) |
| ***H01Q 5/314*** | (2015.01) |
| ***H01Q 9/30*** | (2006.01) |
| ***H01Q 21/28*** | (2006.01) |

(52) U.S. Cl.

CPC ................. *H01Q 9/30* (2013.01); *H01Q 1/20* (2013.01); *H01Q 1/2266* (2013.01); *H01Q 1/52* (2013.01); *H01Q 5/314* (2015.01); *H01Q 21/28* (2013.01)

(58) Field of Classification Search

CPC .......... H01Q 9/30; H01Q 1/20; H01Q 1/2266; H01Q 1/52; H01Q 5/314; H01Q 21/28; H01Q 1/2291; H01Q 5/378

See application file for complete search history.

(56) References Cited

U.S. PATENT DOCUMENTS

| | | | | |
|---|---|---|---|---|
| 7,973,722 | B1 | 7/2011 | Hill | |
| 8,410,984 | B2 * | 4/2013 | Sato | H01Q 1/2258 343/702 |
| 9,130,265 | B1 | 9/2015 | Hill | |
| 10,008,760 | B2 | 6/2018 | Knapton | |

(Continued)

*Primary Examiner* — Hai V Tran
*Assistant Examiner* — Michael M Bouizza
(74) *Attorney, Agent, or Firm* — Prol Intellectual Property Law, PLLC; H. Kenneth Prol

(57) ABSTRACT

An information handling system to wirelessly transmit and receive data at an antenna may include a processor; a memory; a power management unit; a display housing containing components of the information handling system, the display housing including metal sidewalls formed along edges of a back metal chassis of the display housing and generally perpendicular to the back metal chassis; an antenna formed into a first sidewall of the display housing and nested into the first sidewall with a molded plastic keep-out structure to, upon execution of the processor, create radiating radio frequency (RF) bands from the antenna; the antenna operatively coupled to a feed excitation trace to transmit an excitation current to the antenna from a wireless interface adapter; and the plastic molded keep-out structure integrated along the sidewall to secure the antenna to the first sidewall.

20 Claims, 14 Drawing Sheets

(56) References Cited

U.S. PATENT DOCUMENTS

| | | | | |
|---|---|---|---|---|
| 10,938,113 | B1 | 3/2021 | Kim | |
| 2009/0239488 | A1* | 9/2009 | Gushiken | H01Q 1/2266 455/132 |
| 2014/0198441 | A1* | 7/2014 | Sharma | G06F 1/1635 361/679.09 |
| 2014/0361931 | A1 | 12/2014 | Irci | |
| 2015/0338887 | A1 | 11/2015 | Farahani | |
| 2017/0117608 | A1 | 4/2017 | Bologna | |
| 2017/0346157 | A1 | 11/2017 | Aurongzeb | |
| 2018/0070465 | A1* | 3/2018 | Cater | H01Q 1/243 |
| 2018/0217644 | A1* | 8/2018 | Dan | H05K 7/20181 |
| 2019/0097306 | A1* | 3/2019 | Romano | H01Q 21/28 |
| 2020/0259258 | A1* | 8/2020 | Amiri | H01Q 5/378 |
| 2021/0098869 | A1* | 4/2021 | Ruaro | H01Q 1/48 |
| 2022/0344825 | A1* | 10/2022 | Ramasamy | H01Q 13/10 |

* cited by examiner

SYSTEM AND METHOD FOR OPERATING AN APERTURE-COUPLED TUNABLE RING ANTENNA SYSTEM WITH A DETACHABLE METAL KEYBOARD AND INTEGRATED DUAL OPPOSITE OUTLET THERMAL VENT

FIELD OF THE DISCLOSURE

The present disclosure generally relates to information handling systems, and more particularly relates to an information handling system including an antenna and a vent formed within a chassis of the information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include an antenna system that allows the information handling system to be operatively coupled to a wireless communication network.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1A:
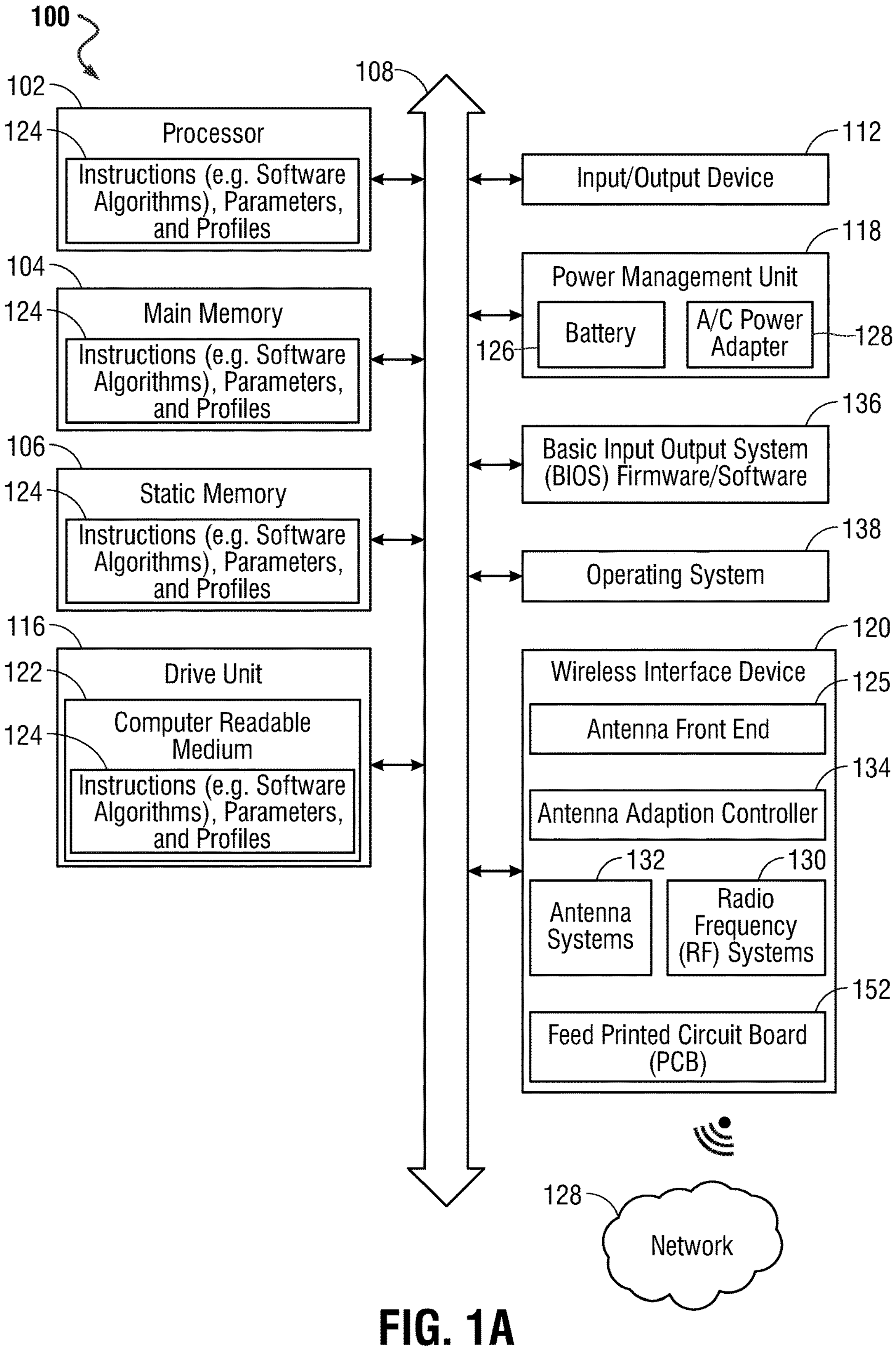
FIG. 1A is a block diagram of an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

For aesthetic, strength, and performance reasons, information handling system chassis parts are more commonly designed with a metal structure. In an example embodiment, a laptop information handling system may include a plurality of metal covers for the interior components of the information handling system. For example, a small form factor case may include a back metal display cover of a display metal cover referred to herein as an A-cover. The display metal cover may also include a front display cover referred herein as a B-cover which may serve as the bezel, if any, and a display screen of the convertible laptop information handling system in an embodiment. In a further example, the information handling system chassis parts may include a base metal housing that includes a keyboard metal chassis referred herein as a metal C-cover used to house a keyboard, touchpad, and any cover in which these components are set. The base metal housing may also include a metal bottom chassis referred herein to also as a D-cover forming a keyboard housing for the convertible information handling system. With the need for utility of lighter, thinner, and more streamlined devices, the use of full metal portions for the outer covers of the display and keyboard housing (e.g., the A-cover and the D-cover) is desirable for strength as well as aesthetic reasons. At the same time, the demands for wireless operation also increase. This includes addition of many simultaneously operating radiofrequency systems, addition of more antennas, and utilization of various antenna types that are being developed for use with hardware associated with 5G communications. However, the thinner and more streamlined devices have fewer locations and area available for mounting radiofrequency transmitters (e.g., antennas) on these mobile information handling systems and especially in the display housing that includes the A-cover and B-cover. Thus, a streamlined, full metal chassis capable of meeting the increasing wireless operation demands is needed.

Previous information handling systems would address these competing needs by providing for cutout portions of a metal outer chassis cover filled with plastic behind which radio transmitters would be mounted. The cutouts to accommodate radio frequency (RF) transmitters were often located in aesthetically undesirable locations or required additional plastic components to cover the cutout, thus not fully meeting the streamlining needs. The plastic components added a component to be manufactured and were required to be seamlessly integrated into an otherwise smooth metal chassis cover.

In addition, in the case of the convertible laptop information handling system, the information handling system may be placed in different configurations. These different configurations of the convertible laptop may include a table configuration, an easel configuration, and an open configuration, among others. Thus, often an antenna such as an aperture antenna system would be located at the top (e.g., A-cover) with a plastic antenna window in a metal chassis cover to radiate in, for example, a closed mode, or at the base (e.g., between the C and D-cover) to radiate, for examples, in an open mode. In an embodiment, a keyboard housing that includes a keyboard, a touch pad, or other type of input device may be selectively detachable from a display housing of the information handling system 100. In this embodiment, the keyboard housing may be recoupled to the display housing using a hinge between the display housing and keyboard housing. This increases the possible configurations of the keyboard housing relative to the display housing because the keyboard housing may be recoupled to the hinge in a reversed fashion. This may allow the keyboard housing to be recoupled to the display housing such that the keyboard of the keyboard housing abuts a back metal housing of the display housing when placed in a tablet configuration, for example. These different configurations are described in more detail herein. Such configurations could make the display housing or the keyboard metal chassis thicker, to accommodate antennas and cables behind the plastic panel at the top (or bottom) of either housing. Overall, an additional of a plastic antenna window in an A-cover or C-cover may not meet the streamlining needs. A solution is needed that does not increase the thickness of the metal chassis, and does not require additional components and manufacturing steps such as those associated with installation of RF transparent windows.

Embodiments of the present disclosure may decrease the complexity and cost of creating chassis for information handling systems by forming the back chassis (e.g., the A-cover) entirely of metal and forming an antenna along a wall of the display housing to, upon execution of the processor, create radiating radio frequency (RF) bands. In an embodiment, this antenna may be located by a thermal vent used to dissipate heat out of the information handling system, respectively. This placement of the antenna at a location along the wall with the thermal vent allows the antenna to be placed at a location that provides for a relatively more streamlined information handling system, reduces space used within the display housing for an antenna, and places the antenna at a location where transmissions and receptions of data may be better transceived as described herein. Additionally, regardless of the orientation of the information handling system, the antenna receipt and transmission strength may remain constant. Still further, the thermal vent includes a one or more holes formed between the back side of the display housing and the walls formed along the edges of the back side. This allows the side walls to be used for a dual purpose thereby placing multiple components of the information handling system at a single location and providing additional space within the information handling system for other potential components.

The metal chassis in embodiments described herein may include a hinge operably connecting the display housing (e.g., A-cover and B-cover) to the keyboard metal chassis (e.g., C-cover and D-cover) such that a keyboard metal chassis relative to the display housing may be placed in a plurality of configurations. In an embodiment, the keyboard metal chassis is selectively removable from the display housing so that some of these configurations may be achieved (e.g., tablet configuration). The plurality of configurations may include, but may not be limited to, an open configuration in which the display housing is oriented at a right or obtuse angle from the keyboard metal chassis (similar to an open laptop computer), a closed configuration in which the display housing lies substantially parallel to the keyboard metal chassis (similar to a closed laptop computer), and a tablet configuration in which the display housing is rotated nearly 360 degrees from its closed orientation (placing the keyboard metal chassis directly beneath the display housing, such that the user can interact with the digital display enclosed within the display housing), a modified tablet orientation where the keyboard portion abuts an A-cover after the keyboard metal chassis has been removed from the display housing and reconnected in a reverse position, or other orientations such as an easel orientation. Despite these different configurations, however, the antenna located at the walls formed along the edges of the back side of the display housing and with the thermal vent provides for the streamlining of the information handling system without compromising the ability of the antenna to transmit and receive data from and to the information handling system.

Manufacture of embodiments of the present disclosure may involve fewer extraneous parts than previous chassis by forming the exterior or outer portions of the information handling system, including the bottom portion of the keyboard metal chassis and the back portion of the display housing, entirely from metal.

Still further, the thermal vent described herein may serve as an antenna isolation barrier or "keep-out" to prevent the metals associated with the keyboard metal chassis from operatively coupling to the antennas formed in the side walls. The antenna may also include a grounding body formed from a section of a wall of the display housing adjacent to the antenna. In an embodiment, the antenna may be a monopole antenna that is operatively coupled to a tunable capacitor to dynamically tune the monopole antenna to a frequency. These features may allow the antenna to transceive data at those frequencies associated with any communication frequency including those associated with 4G and 5G technologies, WLAN/WiFi protocols, or other wireless protocols.

Examples are set forth below with respect to particular aspects of an information handling system including case portions such as for a laptop information handling system including the chassis components designed with a fully metal structure and configurable such that the information handling system may operate in any of several usage mode configurations.

FIG. 1 is a block diagram of an information handling system 100 capable of administering each of the specific embodiments of the present disclosure. The information handling system 100, in an embodiment, can represent the mobile information handling systems 210, 220, and 230 or servers or systems located anywhere within network 200 described in connection with FIG. 2 herein, including the remote data centers operating virtual machine applications. Information handling system 100 may represent a mobile information handling system associated with a user or recipient of intended wireless communication. A mobile information handling system may execute instructions via a processor such as a microcontroller unit (MCU) operating both firmware instructions or hardwired instructions for the antenna adaptation controller 134 to achieve WLAN or WWAN communications according to embodiments disclosed herein. The application programs operating on the information handling system 100 may communicate or otherwise operate via concurrent wireless links, individual wireless links, or combinations over any available radio access technology (RAT) protocols including WLAN protocols and WWAN protocols. These application programs may operate in some example embodiments as software, in whole or in part, on an information handling system while other portions of the software applications may operate on remote server systems. An antenna adaptation controller 134 of the presently disclosed embodiments may operate as firmware or hardwired circuitry or any combination on controllers or processors within the information handing system 100 for interface with components of a wireless interface adapter 120. It is understood that some aspects of the antenna adaptation controller 134 described herein may interface or operate as software or via other controllers associated with the wireless interface adapter 120 or elsewhere within information handling system 100. Information handling system 100 may also represent a networked server or other system from which some software applications are administered or which wireless communications such as across WLAN or WWAN may be conducted. In other aspects, networked servers or systems may operate the antenna adaptation controller 134 for use with a wireless interface adapter 120 on those devices similar to embodiments for WLAN or WWAN antenna optimization operation according to according to various embodiments.

The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video/graphic display device 110, such as a liquid crystal display (LCD), an organic light emitting diode (OLED), a flat panel display, or a solid-state display. The video/graphic display device 110 may include a touch screen display module and touch screen controller (not shown) for receiving user inputs to the information handling system 100. Touch screen display module may detect touch or proximity to a display screen by detecting capacitance changes in the display screen as understood by those of skill. Additionally, the information handling system 100 may include an input/output device 112, such as a keyboard, a printer, and a cursor control device, such as a mouse or touchpad or similar peripheral input device. The information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), the video/graphic display device 110, and other components that may require power when a power button has been actuated by a user. In an embodiment, the PMU 118 may be electrically coupled to the information handling system 100 to provide this power. The PMU 118 may regulate power from a power source such as a battery 126 or A/C power adapter 128. In an embodiment, the battery 126 may be charged via the A/C power adapter 128 and provide power the to the components of the information handling system 100 when A/C power from the A/C power adapter 128 is removed. The PMU 118 may be coupled to the bus 108 to provide power transfer data or provide or receive power management instructions.

In an embodiment, the information handling system 100 can also represent a server device whose resources can be shared by multiple client devices in an embodiment. In another embodiment, the information handling system 100 may represent an individual client device, such as a desktop personal computer, a laptop computer, a tablet computer, a 360-degree convertible device, a wearable computing device, or a mobile smart phone that communicates to a network 128 via the wireless interface adapter 120 and its associated antenna systems 132 as described herein.

The information handling system 100 can include sets of instructions 124 that can be executed to cause the computer system to perform any one or more desired applications. In many aspects, sets of instructions 124 may implement wireless communications via one or more antenna systems 132 available on information handling system 100. Operation of WLAN and WWAN wireless communications may be enhanced or otherwise improved via WLAN or WWAN antenna operation adjustments via the methods or controller-based functions relating to the antenna adaptation controller 134 disclosed herein. For example, instructions or a controller may execute software or firmware applications or algorithms which utilize one or more wireless signal parameters via the wireless adapter interface for wireless communications via the wireless interface adapter as well as other aspects or components. The antenna adaptation controller 134 may execute instructions as disclosed herein for monitoring wireless link state information, information handling system configuration data, SAR proximity sensor detection, or other input data to generate channel estimation and determine antenna radiation patterns. In the embodiments presented herein, the antenna adaptation controller 134 may execute instructions as disclosed herein to transmit a communications signal from an antenna located along walls formed along the edges of a back side of the display housing and generally perpendicular to the back side to create radiating radio frequency (RF) bands. In the embodiments presented herein, the antenna adaptation controller 134 may execute instructions as disclosed herein to adjust, via a parasitic coupling element for example, change the directionality and/or pattern of the emitted RF signals from the antenna system 132. The antenna adaptation controller 134 may implement adjustments to wireless antenna systems and resources via a radio frequency integrated circuit (RFIC) front end 125 and WLAN or WWAN radio module systems within the wireless interface device 120. Aspects of the antenna optimization for the antenna adaptation controller 134 may be included as part of an antenna front end 125 in some aspects or may be included with other aspects of the wireless interface device 120 such as WLAN radio module such as part of the RF systems 130. The antenna adaptation controller 134 described in the present disclosure and operating as firmware or hardware (or in some parts software) may remedy or adjust one or more of a plurality of antenna systems 132 via selecting power adjustments and adjustments to an antenna adaptation network to modify antenna radiation patterns and parasitic coupling element operations. Multiple WLAN or WWAN antenna systems may operate on various communication frequency bands such as under IEEE 802.11a and IEEE 802.11g providing multiple band options for frequency channels. Further antenna radiation patterns and selection of antenna options or power levels may be adapted due physical proximity of other antenna systems, of a user with potential SAR exposure, or improvement of RF channel operation according to received signal strength indicator (RSSI), signal to noise ratio (SNR), bit error rate (BER), modulation and coding scheme index values (MCS), or data throughput indications among other factors. In some aspects WLAN antenna adaptation controller may execute firmware algorithms or hardware to regulate operation of the one or more antenna systems 132 such as WLAN antennas in the information handling system 100 to avoid poor wireless link performance due to poor reception, poor MCS levels of data bandwidth available, or poor indication of throughput due to indications of low RSSI, low power levels available (such as due to SAR), inefficient radiation patterns among other potential effects on wireless link channels used.

Various software modules comprising software application instructions 124 or firmware instructions may be coordinated by an operating system (OS) 138 and via an application programming interface (API). An example OS 138 may include Windows®, Android®, and other OS 138 types known in the art. Example APIs may include Win 32®, Core Java® API, Android® APIs, or wireless adapter driver API. In a further example, processor 102 may conduct processing of mobile information handling system applications by the information handling system 100 according to the systems and methods disclosed herein which may utilize wireless communications. In the embodiments, the OS 138 may be bootstrapped using a basic input/output system (BIOS) firmware/software 136 to initiate a user interface with the user. The computer system 100 may operate as a standalone device or may be connected such as using a network, to other computer systems or peripheral devices. In other aspects, additional processor or control logic may be implemented in graphical processor units (GPUs) or controllers located with radio modules or within a wireless adapter 120 to implement method embodiments of the antenna adaptation controller 134 and antenna optimization according to embodiments herein. Code instructions 124 in firmware, hardware or some combination may be executed to implement operations of the antenna adaptation controller and antenna optimization on control logic or processor systems within the wireless adapter 120 for example.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a tablet computer, a laptop computer, a desktop computer, a communications device, a wireless smart phone, wearable computing devices, a control system, a camera, a scanner, a printer, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Some memory or storage may reside in the wireless interface adapter 120. Further, the instructions 124 that embody one or more of the methods or logic as described herein. For example, instructions relating to the antenna adaptation system or antenna adjustments described in embodiments herein may be stored here or transmitted to local memory located with the antenna adaptation controller 134, antenna front end 125, or wireless module in radiofrequency (RF) subsystem 130 in the wireless interface adapter 120.

In a particular embodiment, the instructions, parameters, and profiles 124 may reside completely, or at least partially, within a memory, such as non-volatile static memory, during execution of antenna adaptation by the antenna adaptation controller 134 in wireless interface adapter 132 of information handling system 100. As explained, some or all of the antenna adaptation and antenna optimization may be executed locally at the antenna adaptation controller 134, RF front end 125, or wireless module subsystem 130. Some aspects may operate remotely among those portions of the wireless interface adapter 120 or with the main memory 104 and the processor 102 in parts including the computer-readable media in some embodiments.

The network interface device shown as wireless interface adapter 120 can provide connectivity to a network 128, e.g., a wide area network (WAN), a local area network (LAN), wireless local area network (WLAN), a wireless personal area network (WPAN), a wireless wide area network (WWAN), or other types of networks. Connectivity may be via wired or wireless connection. Wireless interface adapter 120 may include one or more RF systems 130 with transmitter/receiver circuitry, modem circuitry, one or more antenna front end circuits 125, one or more wireless controller circuits such as antenna adaptation controller 134, amplifiers, antenna systems 132 and other RF subsystem circuitry 130 for wireless communications via multiple radio access technologies. Each RF subsystem 130 may communicate with one or more wireless technology protocols. The RF subsystem 130 may contain individual subscriber identity module (SIM) profiles for each technology service provider and their available protocols for subscriber-based radio access technologies such as cellular LTE communications. The wireless adapter 120 may also include antenna systems 132 which, according to the embodiments described herein, may be tunable antenna systems or may include an antenna adaptation network for use with the system and methods disclosed herein to optimize antenna system operation. Additional antenna system adaptation network circuitry (not shown) may also be included with the wireless interface adapter 120 to implement WLAN or WWAN modification measures.

In some aspects of the present disclosure, a wireless adapter 120 may operate one or more wireless links. In a further aspect, the wireless adapter 120 may operate the two or more wireless links with a single, shared communication frequency band such as with the Wi-Fi WLAN operation or 5G LTE standard WWAN operations in an example aspect. For example, a 5 GHz wireless communication frequency band may be apportioned under the 5G standards for communication on either small cell WWAN wireless link operation or Wi-Fi WLAN operation as well as other wireless activity in LTE, WiFi, WiGig, Bluetooth, or other communication protocols. In some embodiments, the shared, wireless communication bands may be transmitted through an antenna of the antenna systems 132. Other communication frequency bands are contemplated for use with the embodiments of the present disclosure as well.

In other aspects of the embodiments described herein, the information handling system 100 operating as a mobile information handling system may include an antenna located at a wall formed along the edges of a back side of the display housing and generally perpendicular to the back side bottom metal chassis (e.g., D-cover). The walls where the monopole antenna is formed may, in an embodiment, be used also as a thermal vent to direct heated air in the display housing out of the information handling system. In an embodiment, within the display housing, a feed printed circuit board (PCB) may be operatively coupled to the monopole antenna to direct an excitation signal or current to the monopole antenna. By operatively coupling the feed PCB 152 to the monopole antenna, the monopole antenna may operate as an antenna by transmitting and receiving RF emissions.

The wireless adapter 120 may operate the antenna systems 132 with the monopole antennas described herein in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 and antenna adaptation controller 134 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under communication frequency bands for WLAN in example embodiments. WWAN may operate in a number of bands, some of which are propriety but may include a wireless communication frequency band at approximately 2.5 GHz band for example. In additional examples, WWAN carrier licensed bands may operate at frequency bands at the new radio frequency range (NRFR) 1, NRFR2, bands at sub-6 GHz and above 6 GHz, and other known bands. It is understood that any number of available channels may be available under the 5 GHz shared communication frequency band for WLAN. WLAN, in another example, may also operate at a 2.4 GHz band. WWAN may operate in a number of bands, some of which are proprietary but may include a wireless communication frequency band at approximately 2.5 GHz or 5 GHz bands for example. In additional examples, WWAN carrier licensed bands may operate at frequency bands of approximately 700 MHz, 800 MHz, 1900 MHz, or 1700/2100 MHz as well as the NRFR1, NFRF2, bands, and other known bands. In the example embodiment, mobile information handling system 100 includes both unlicensed wireless RF communication capabilities as well as licensed wireless RF communication capabilities. For example, licensed wireless RF communication capabilities may be available via a subscriber carrier wireless service. With the licensed wireless RF communication capability, WWAN RF front end may operate on a licensed WWAN wireless radio with authorization for subscriber access to a wireless service provider on a carrier licensed frequency band.

The wireless adapter 120 can represent an add-in card, wireless network interface module that is integrated with a main board of the information handling system or integrated with another wireless network interface capability, or any combination thereof. In an embodiment the wireless adapter 120 may include one or more RF systems 130 including transmitters and wireless controllers such as wireless module subsystems for connecting via a multitude of wireless links under a variety of protocols. In an example embodiment, an information handling system 100 may have an antenna system 132 transmitter (e.g., the monopole antenna described herein) for 5G small cell WWAN, Wi-Fi WLAN or WiGig connectivity and one or more additional antenna system 132 transmitters (e.g., another monopole antenna) for macro-cellular communication. The RF systems 130 include wireless controllers to manage authentication, connectivity, communications, power levels for transmission, buffering, error correction, baseband processing, and other functions of the wireless interface adapter 120.

The RF systems 130 of the wireless adapters may also measure various metrics relating to wireless communication pursuant to operation of an antenna system as in the present disclosure. For example, the wireless controller of a RF subsystem 130 may manage detecting and measuring received signal strength levels, bit error rates, signal to noise ratios, latencies, power delay profile, delay spread, and other metrics relating to signal quality and strength. Such detected and measured aspects of wireless links, such as WLAN links operating on one or more antenna systems 132, may be used by the antenna adaptation controller 134 to adapt the antenna systems 132 according to an antenna adaptation network. In an embodiment, a wireless controller of a wireless interface adapter 120 may manage one or more RF systems 130. The wireless controller also manages transmission power levels which directly affect RF subsystem power consumption as well as transmission power levels from the plurality of antenna systems 132. The transmission power levels from the antenna systems 132 may be relevant to specific absorption rate (SAR) safety limitations for transmitting mobile information handling systems. To control and measure power consumption via a RF subsystem 130, the RF subsystem 130 may control and measure current and voltage power that is directed to operate one or more antenna systems 132.

The wireless network 128 may have a wireless mesh architecture in accordance with mesh networks described by the wireless data communications standards or similar standards in some embodiments but not necessarily in all embodiments. The wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs, and BIOS firmware/software 136. BIOS firmware/software 136 functions to initialize information handling system 100 on power up, to launch an OS 138, and to manage input and output interactions between the operating system and the other elements of information handling system 100. In a particular embodiment, BIOS firmware/software 136 reside in memory 104, and include machine-executable code that is executed by processor 102 to perform various functions of information handling system 100. In another embodiment (not illustrated), application programs and BIOS firmware/software 136 reside in another storage medium of information handling system 100. For example, application programs and BIOS firmware/software 136 can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs 124 and BIOS firmware/software 136 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 1B:
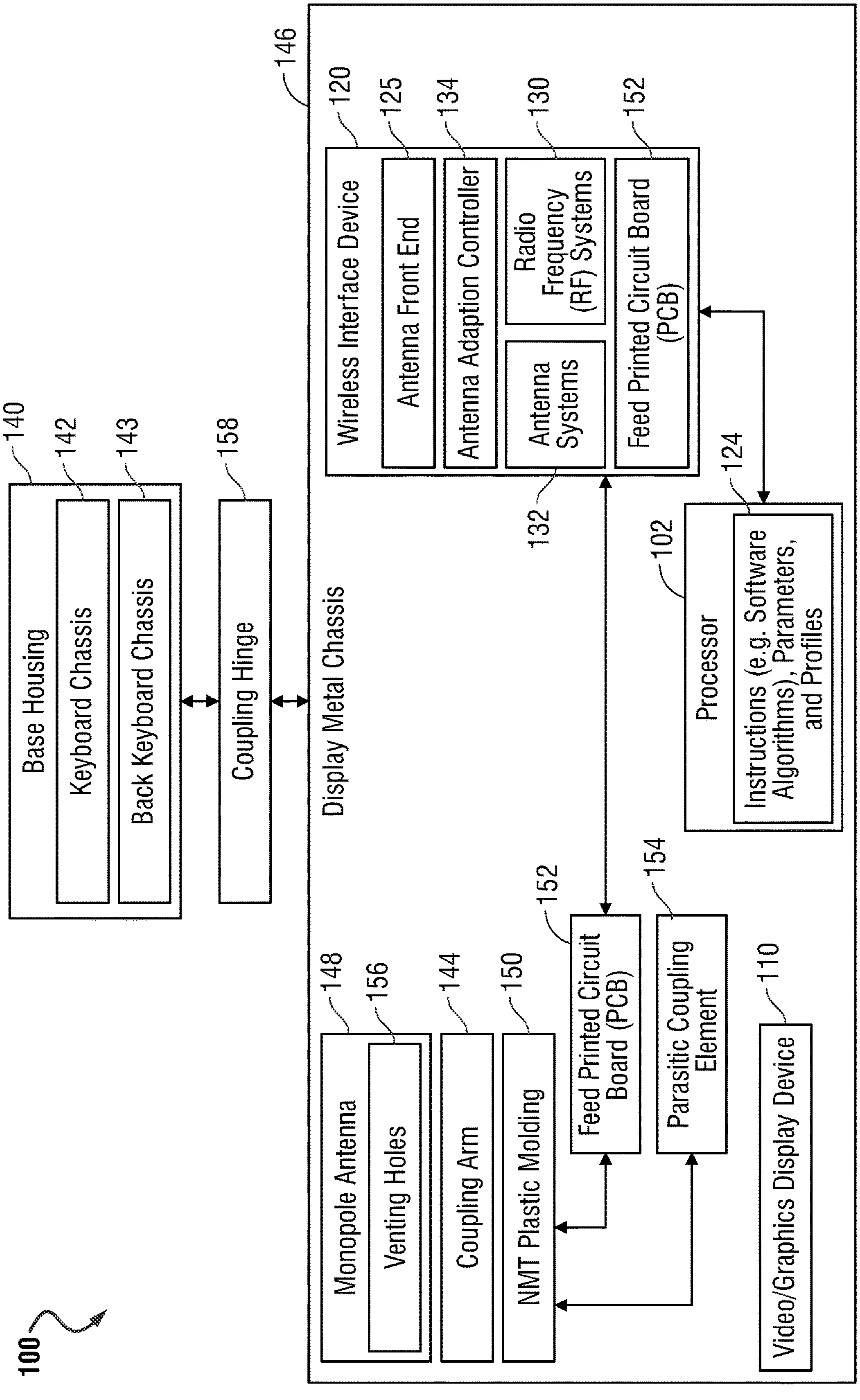
FIG. 1B is a block diagram of an information handling system having an antenna according to another embodiment of the present disclosure.

FIG. 1B is a block diagram of an embodiment of information handling system 100 according to another embodiment of the present disclosure. The information handling system 100 may include a keyboard housing 140 and a display housing 146 operatively and selectively coupled to each other via a coupling hinge 158. As described herein, the coupling hinge 158 may be decoupled from either or both of the keyboard housing 140 and display housing 146 so that these two chassis may be rearranged relative to each other in order to achieve certain orientations of these parts relative to each other.

In this embodiment, the keyboard housing 140 may include a keyboard chassis 142 (e.g., a C-cover) and a back keyboard chassis 143 (e.g., a D-cover) that is operatively coupled to and placed against the display housing 146 in certain configurations as described herein. In some embodiments, the keyboard chassis 142 (e.g., a C-cover) and a back keyboard chassis 143 (e.g., a D-cover) may be metal or partially metal. In an embodiment, the keyboard housing 140 may be selectively detachable when the user intends to place the information handling system 100 in a specific configuration such as a modified tablet configuration. In some embodiments, the information handling system 100 may be placed in a tablet configuration, an easel configuration, an open configuration, a closed configuration, among others described herein.

As described herein, the information handling system 100 may include a processor 102 such as a central processing unit (CPU), a graphics processing unit (GPU), or both. As shown, the information handling system 100 may further include a video/graphic display device 110, such as a liquid crystal display (LCD), an organic light emitting diode (OLED), a flat panel display, or a solid-state display. The video/graphic display device 110 may include a touch screen display module and touch screen controller (not shown) for receiving user inputs to the information handling system 100. Touch screen display module may detect touch or proximity to a display screen by detecting capacitance changes in the display screen as understood by those of skill. Additionally, the information handling system 100 may include an input/output device, such as a keyboard, a printer, and a cursor control device, such as a mouse or touchpad or similar peripheral input device. The information handling system 100 may further include a power management unit (PMU) (a.k.a. a power supply unit (PSU)) similar to that described in connection with FIG. 1A. The PMU may manage the power provided to the components of the information handling system 100 such as the processor 102, a cooling system, one or more drive units 116, a graphical processing unit (GPU), the video/graphic display device 110, and other components that may require power when a power button has been actuated by a user. In an embodiment, the PMU may be operatively coupled to a bus to provide power management data and send or receive instructions relating to power management functions. The PMU 128 may regulate an electrical connection to battery power 130 or alternating current (A/C) power sources 132 to provide power to the information handling system 100. The PMU may regulate power from a power source such as a battery or A/C power adapter. In an embodiment, the battery may be charged via the A/C power adapter and provide power the to the components of the information handling system 100 when A/C power from the A/C power adapter 128 is removed.

As described herein, the information handling system 100 operating as a mobile information handling system may include an antenna located at a wall formed along the edges of a back side of the display housing 146 and generally perpendicular to the back side bottom metal chassis 146 (e.g., D-cover). The walls where the monopole antenna 148 is formed may, in an embodiment, be used also as a thermal vent to direct heated air in the display housing 146 out of the information handling system. In other embodiments, the walls with the monopole antenna 148 may instead be used as an audio vent to direct audio signals originating from a speaker within the information handling system 100 to pass out of the venting holes 156. In an embodiment, within the display housing 146, a feed printed circuit board (PCB) 152 may be operatively coupled to the monopole antenna 148 to direct an excitation signal or current to the monopole antenna 148. By operatively coupling the feed PCB 152 to the monopole antenna 148, the monopole antenna 148 may operate as an antenna by transmitting and receiving RF emissions.

In an embodiment, the monopole antenna 148 may be created using a computer numerical control (CNC) process to cut the monopole antenna 148 out from a wall formed along the edges of a back side of the display housing 146. A CNC process includes the automated control of machining tools by a computing device in order to processes or cut away, in these embodiments, the metal structures of the monopole antenna 148 from the side walls of the display housing 146. In order to hold the monopole antenna 148 to the display housing 146 after they have been cut away, a nano-molded technology (NMT) plastic molding 150 may be used to secure the monopole antenna 148 along the edge of the back side (e.g., A-cover) display housing 146. As such, the monopole antenna 148 is physically coupled to the display housing 146 via this NMT plastic molding 150 after being cut away using the CNC process. This NMT plastic molding 150 may serve, in addition to physically holding the monopole antenna 148 to the display housing 146, as an isolation barrier to prevent any metals from interfering with the operation of the monopole antenna 148. These metals may be associated with, for example, a keyboard housing that includes a keyboard metal chassis (e.g., a C-cover) and a back keyboard chassis (e.g., a D-cover) that is placed against the display housing in certain configurations as described herein. This NMT plastic molding 150 may act as an antenna keep-out so that the transmission of RF signals from the monopole antenna 148 may not be subjected to the interference of the metallic body of the keyboard metal chassis 142. The use of the NMT plastic molding 150 may additionally add to the aesthetics of the information handling system with the NMT plastic molding 150 being placed within the relatively small CNC formed cuts in the display housing 146 used to form the monopole antenna 148.

In an embodiment, the NMT plastic molding 150 may also include one or more venting holes 156 formed therein. In this embodiment, the venting holes 156 may be formed at an angle relative to the back side of the display metal cover and the walls so that the heated air, for example, may directed away from potentially heat-sensitive devices of the information handling system 100 such as the video/graphics display device 110. This heated air may be passed out of the venting holes 156 using a blower system such as a dual opposite outlet blower system. In other embodiments, vent holes may be used as an audio vent to allow speaker sounds to be emitted or audio sounds to be captured by a microphone.

In an embodiment, one or more venting holes 156 may also be formed through the monopole antenna 148. In an embodiment, these venting holes 156 formed in the monopole antenna 148 may serve as the only holes through which the heated air within the information handling system 100 may be passed out of the information handling system 100. Alternatively, the venting holes 156 formed in the monopole antenna 148 may be in addition to the venting holes 156 formed in the NMT plastic molding 150 so that more significant amounts of heated air may be passed out of the information handling system 100. In other embodiments, vent holes may be used as an audio vent to allow speaker sounds to be emitted or audio sounds to be captured by a microphone.

In order to pass the heated air out of the interior of the information handling system 100, and more specifically, the display housing 146, the information handling system 100 may include a blower system such as a dual opposite outlet blower system previously mentioned. The dual opposite outlet blower system may pass heated air out of the information handling system from two thermal vents including one or more holes defined at each of the antennas and/or one or more venting holes 156 formed in the NMT plastic molding 150. The dual opposite outlet blower system may direct heat out of opposite walls formed along the edges of the back side of the display housing 146. As such, in an embodiment, each of these opposite walls on the display housing 146 may each include both the NMT plastic molding 150 and the monopole antenna 148. Indeed, in an embodiment, each of the four walls formed along the edges of a back side of the display housing 146 may include a monopole antenna 148 and NMT plastic molding 150 such that a ring of monopole antennas 148 may be formed around the entire circumference of the display housing 146. These monopole antennas 148 may each be formed, by length for example, to emit a specific RF or range of RFs to increase the types and numbers of wireless networks to communicatively couple the wireless interface adapter 120 and information handling system 100, generally. Again, each of these monopole antennas 148 may be operatively coupled to a tunable capacitor to dynamically tune these monopole antennas 148 to a specific RF or range of RFs.

In an embodiment, the monopole antenna 148 may be operatively coupled to the wireless interface adapter 120, processor 102, and a feed PCB 152. A coupling arm 144 may be part of a grounding source used to form a capacitively coupled aperture with monopole antenna 148 seamlessly integrating and/or concealing the monopole antenna 148 into the side wall of the display housing 146 in another aspect. In an embodiment, a feed excitation trace or a portion of the walls of the display housing 146 may be used to transmit an excitation signal from or provide a received signal to the wireless interface adapter 120, processor 102, and a feed PCB 152 to the monopole antenna 148 so that the monopole antenna 148 may transceive data. The coupling arm 144 may be operatively coupled to a grounding source so that the metal of the back side of the display housing 146 does not interfere with the operation of the monopole antenna 148.

In an optional embodiment, the display housing 146 and its monopole antenna 148 may include a parasitic coupling element 154. In such an embodiment, the parasitic coupling element 154 may be used to selectively change the RF emitted from the monopole antenna 148 structure so that the range of RF emitted by the monopole antenna 148 may be increased. Additionally, or alternatively, the monopole antenna 148 may be operatively coupled to a tunable capacitor that enables the monopole antenna 148 to emit RFs that include those RFs associated with any 4G or 5G, licensed or unlicensed RFs as within the capability of a particular monopole antenna 148 based on length or grounding.

The wireless adapter 120 may operate the antenna systems 132 with the monopole antennas 148 described herein in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 and antenna adaptation controller 134 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band in example embodiments. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. It is understood that any number of available channels may be available under the 5 GHz shared communication frequency bands for WLAN. WWAN may operate in a number of bands, some of which are proprietary but may include a wireless communication frequency band at approximately 2.5 GHz or 5 GHz bands for example. In additional examples, WWAN carrier licensed bands may operate at frequency bands at the NRFR1, NRFR2, bands at sub-6 GHz and above 6 GHz, and other known bands. In the example embodiment, mobile information handling system 100 includes both unlicensed wireless RF communication capabilities as well as licensed wireless RF communication capabilities. For example, licensed wireless RF communication capabilities may be available via a subscriber carrier wireless service. With the licensed wireless RF communication capability, WWAN RF front end may operate on a licensed WWAN wireless radio with authorization for subscriber access to a wireless service provider on a carrier licensed frequency band.

The wireless adapter 120 can represent an add-in card, wireless network interface module that is integrated with a main board of the information handling system or integrated with another wireless network interface capability, or any combination thereof. In an embodiment the wireless adapter 120 may include one or more RF systems 130 including transmitters and wireless controllers such as wireless module subsystems for connecting via a multitude of wireless links under a variety of protocols. In an example embodiment, an information handling system 100 may have an antenna system 132 transmitter (e.g., the monopole antenna 148) for 5G small cell WWAN, Wi-Fi WLAN or WiGig connectivity and one or more additional antenna system 132 transmitters (e.g., another monopole antenna 148) for macro-cellular communication. The RF systems 130 include wireless controllers to manage authentication, connectivity, communications, power levels for transmission, buffering, error correction, baseband processing, and other functions of the wireless adapter 120.

The RF systems 130 of the wireless adapters may also measure various metrics relating to wireless communication pursuant to operation of an antenna system as in the present disclosure. For example, the wireless controller of a RF subsystem 130 may manage detecting and measuring received signal strength levels, bit error rates, signal to noise ratios, latencies, power delay profile, delay spread, and other metrics relating to signal quality and strength. Such detected and measured aspects of wireless links, such as WLAN links operating on one or more antenna systems 132, may be used by the antenna adaptation controller 134 to adapt the antenna systems 132 according to an antenna adaptation network. In an embodiment, a wireless controller of a wireless interface adapter 120 may manage one or more RF systems 130. The wireless controller also manages transmission power levels which directly affect RF subsystem power consumption as well as transmission power levels from the plurality of antenna systems 132. The transmission power levels from the antenna systems 132 may be relevant to specific absorption rate (SAR) safety limitations for transmitting mobile information handling systems. To control and measure power consumption via a RF subsystem 130, the RF subsystem 130 may control and measure current and voltage power that is directed to operate one or more antenna systems 132.

The wireless network 128 may have a wireless mesh architecture in accordance with mesh networks described by the wireless data communications standards or similar standards in some embodiments but not necessarily in all embodiments. The wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

Figure 2:
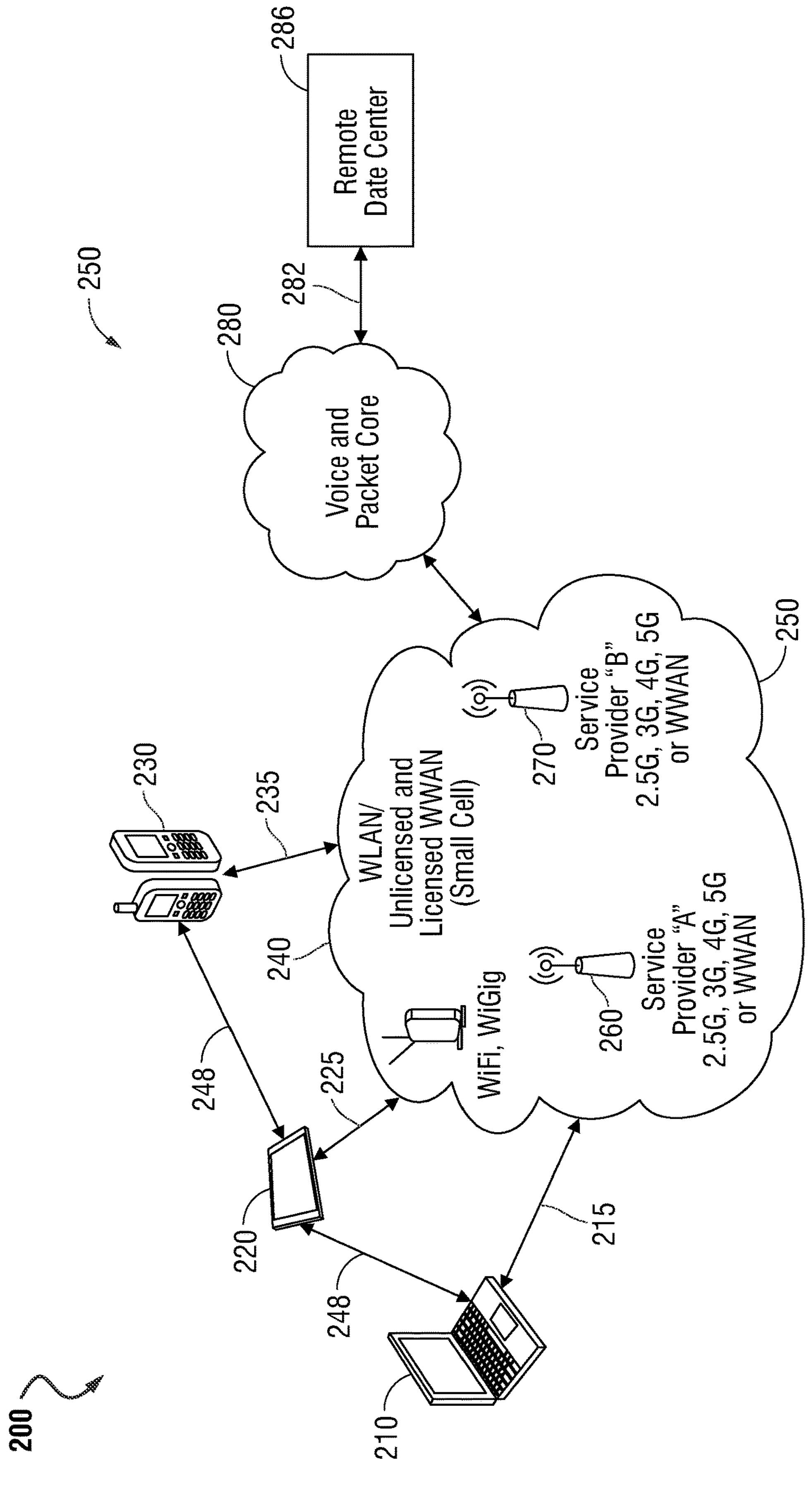
FIG. 2 is a block diagram of a network environment offering several communication protocol options and mobile information handling systems according to an embodiment of the present disclosure.

FIG. 2 illustrates a network 200 that can include one or more information handling systems 210, 220, 230. In a particular embodiment, network 200 includes networked mobile information handling systems 210, 220, and 230, wireless network access points, and multiple wireless connection link options. A variety of additional computing resources of network 200 may include client mobile information handling systems, data processing servers, network storage devices, local and wide area networks, or other resources as needed or desired. As partially depicted, systems 210, 220, and 230 may be a laptop computer, tablet computer, 360-degree convertible systems, wearable computing devices, or a smart phone device. These mobile information handling systems 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, or emerging 5G small cell WWAN communications such as gNodeB, 4G eNodeB, or similar wireless network protocols. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums as described herein. In the example embodiment, mobile information handling systems 210, 220, and 230 include both unlicensed wireless RF communication capabilities as well as licensed wireless RF communication capabilities. For example, licensed wireless RF communication capabilities may be available via a subscriber carrier wireless service. With the licensed wireless RF communication capability, WWAN RF front end may operate on a licensed WWAN wireless radio with authorization for subscriber access to a wireless service provider on a carrier licensed frequency band.

In some embodiments according to the present disclosure, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, as described herein, a single antenna or more than one antennas may be used on each of the wireless communication devices. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96 (e.g., Citizens Broadband Radio Service (CBRS)). Wi-Fi ISM frequency bands may be subject to sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology. This may create situations where a plurality of antenna systems are operating on a mobile information handling system 210, 220 or 230 via concurrent communication wireless links on both WLAN and WWAN and which may operate within the same, adjacent, or otherwise interfering communication frequency bands. The antenna may be a transmitting antenna that includes high-band, medium-band, low-band, and unlicensed band transmitting antennas. Alternatively, embodiments may include a single transceiving antennas capable of receiving and transmitting, and/or more than one transceiving antennas. Each of the antennas included in the information handling system (e.g., 100 FIG. 1) in an embodiment may be subject to the FCC regulations on specific absorption rate (SAR). The antenna described herein includes a monopole antenna, placed at a thermal vent, that is excited via a feed PCB. In an embodiment, the vent may include one or more of an audio vent or a thermal vent. In order to support a specific RF, the length of the antenna may be altered to fit a specific RF frequency. In the embodiments herein, the antenna may be one of many antennas that each, individually, emit a specific RF such that each of the information handling systems 210, 220, 230 may communicate over a variety of communication networks as described herein.

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices. Similarly, remote data center permits fewer resources to be maintained in other parts of network 200.

Although 215, 225, and 235 are shown connecting wireless adapters of mobile information handling systems 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as an access point or even potentially an WWAN connection via small cell communication on licensed or unlicensed WWAN connections. For example, one of mobile information handling systems 210, 220, and 230 may serve as a Wi-Fi hotspot in an embodiment. Concurrent wireless links to information handling systems 210, 220, and 230 may be connected via any access points including other mobile information handling systems as illustrated in FIG. 2.

Figure 3A:
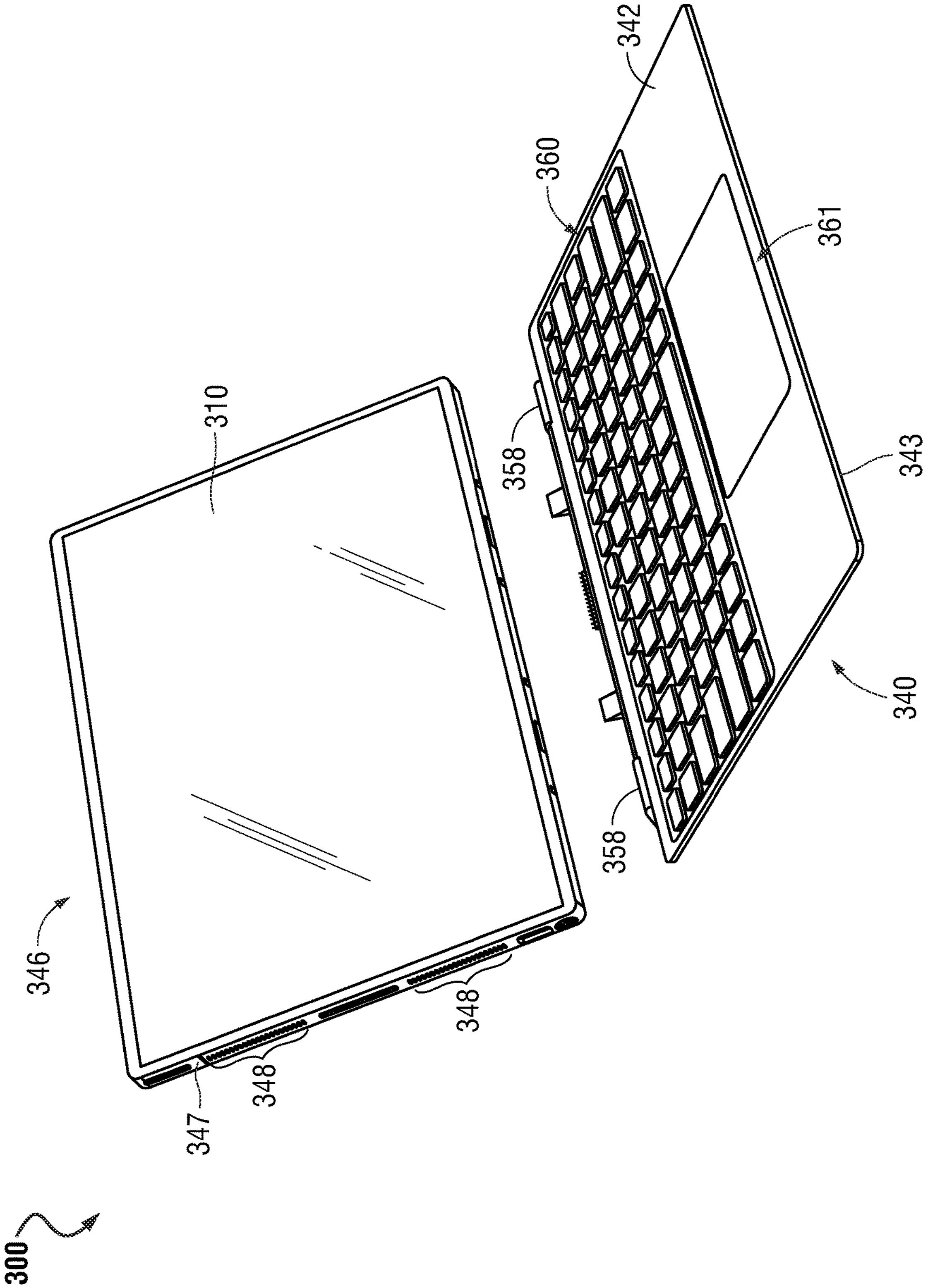
FIG. 3A is a graphical illustration perspective view of an information handling system having a display housing and a keyboard housing placed in a first uncoupled configuration according to an embodiment of the present disclosure.

FIG. 3A is a graphical illustration perspective view of an information handling system 300 having a display housing 346 and a keyboard housing 340 placed in a first uncoupled configuration according to an embodiment of the present disclosure. It is understood that those elements described in connection with FIG. 3A may also be included in FIGS. 3B-3E. The information handling system 300, may include a selectively detachable keyboard chassis 342. The keyboard chassis 342 may be selectively detachable when the user intends to place the information handling system 300 in a specific configuration such as a modified tablet configuration as shown in FIG. 3E in an embodiment. In the embodiment shown in FIG. 3A, the keyboard chassis 342 has been detached or decoupled from the display housing 346. During coupling, the keyboard chassis 342 may be operatively coupled to the display housing 346 via one or more hinges 358 that have been configured to allow for such selective decoupling and coupling. Latches, magnets, plug connectors, wireless connections and other operative coupling systems may also be used to operatively couple the keyboard chassis 342 to the display housing 346 via hinges 358 in various embodiments.

The keyboard housing 340 may include, as described herein, a keyboard chassis 342 and a back keyboard chassis 343. The keyboard chassis 342 and back keyboard chassis 343 may encase a number of devices associated with the operation of the information handling system 300 and my include, among other hardware devices, peripheral application specific integrated circuits (ASICs), circuitry associated with a keyboard 360, and circuitry associated with a touch pad 361. The activation and powering of the devices in the keyboard housing 340 may be accomplished when the keyboard housing 340 is coupled to the display housing 346 via the hinges 358 in an embodiment.

As described herein, the display housing 346 may include a back metal chassis (not shown) with four side walls 347. Each side wall 347 may be formed along the edges of the back metal chassis of the display housing 346 and generally perpendicular or curved relative to that back metal chassis. As described herein, one or more of the four side walls 347 may have a monopole antenna 348 formed therein. In an embodiment, the monopole antenna 348 may be formed by cutting a portion of the side wall 347 away using a CNC process to form the monopole antenna 348 along the sidewall. By cutting away the monopole antenna 348, the monopole antenna 348 may be secured to the display housing 346 using a NMT plastic molding 350 molding the monopole antenna 348 to the display housing 346 using the NMT processes as described in embodiments herein. This process allows the monopole antenna 348 to be selectively excited from a feed PCB (not shown) and a processor (not shown). As described herein, the placement and length of the monopole antennas 348 along the side walls 347 may depend on the type of RF emissions intended to be emitted by the information handling system 300 (e.g., WiFi or LTE related RF emissions, or both).

The display housing 346 includes a video/graphics display device 310. The video/graphics display device 310 may be coupled to the display back metal chassis of the display housing 346. In an embodiment, the video/graphics display device 310 may be coupled to the display back metal chassis using a bezel. In an alternative embodiment and in order to increase the visual size of the video/graphics display device 310, the side walls 347 of the display back metal chassis may meet the edges of the video/graphics display device 310 and be press fit, snap fit, glued, attached with a track or latch system, attached with a screw, post or other fastener, or otherwise affixed to the display back metal chassis. In this embodiment, the edges of the display back metal chassis may extend to the side walls 347 so as to increase the screen size of the video/graphics display device 310 thereby increasing user satisfaction and aesthetics of the information handling system 300.

Figure 3B:
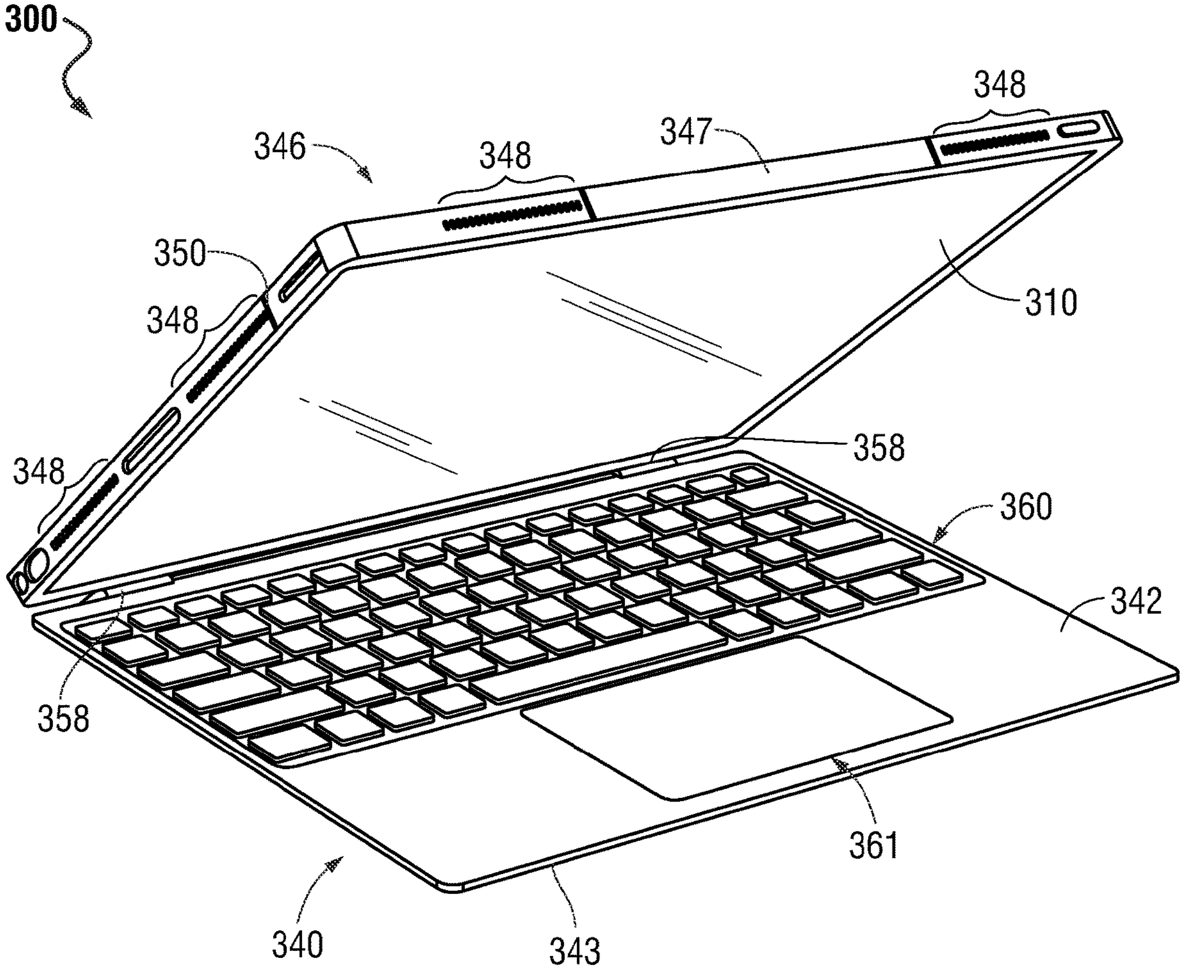
FIG. 3B is a graphical illustration perspective view of an information handling system having a display housing and a keyboard housing placed in a first coupled and semi-closed configuration according to an embodiment of the present disclosure.

Similar to FIG. 3A, FIG. 3B is a graphical illustration perspective view of an information handling system 300 having a display housing 346 and a keyboard metal chassis 342 placed in a first coupled and semi-closed configuration according to an embodiment of the present disclosure. The information handling system 300 may include the monopole antennas 348 formed in the side walls 347 of the display back metal chassis as described herein and may be formed as described. In this embodiment, the includes one or more monopole antennas 348 formed into the side walls 347 of the display back metal chassis (e.g., 349 in FIGS. 3C and 3D). The side walls 347 where the monopole antennas 348 are formed may, in an embodiment, be used also as a thermal vent to direct heated air in the display housing 346 out of the information handling system 300. In an embodiment, within the display housing 346, a feed PCB (not shown) may be operatively coupled to the monopole antennas 348 to direct an excitation signal or current to the monopole antennas 348. By operatively coupling the feed PCB to the monopole antennas 348, the monopole antennas 348 may operate as antennas by transmitting and receiving RF emissions.

In an embodiment, a monopole antenna 348 may be created using a CNC process to cut the monopole antenna 348 out from a side wall 347 formed along the edges of a display back metal chassis 349 of the display housing 346. In order to hold the monopole antenna 348 to the display housing 346, the process may include using a nano-molded technology (NMT) plastic molding 350 that secures the monopole antenna 348 along the edge of the display back metal chassis (e.g., A-cover) of the display housing 346. As such, the monopole antenna 348 is physically coupled to the display housing 346 via this NMT plastic molding 350. This NMT plastic molding 350 may serve, in addition to physically hold the monopole antenna 348 to the display housing 346, as an isolation barrier to prevent any metals associated with, for example, a keyboard housing 340 that includes a keyboard metal chassis 342 (e.g., a C-cover) and a back keyboard chassis 343 (e.g., a D-cover) that is placed against the display housing 346 in certain configurations as described herein. This NMT plastic molding 350 may act as an antenna keep out so that the transmission of RF signals from the monopole antenna 348 may not be subjected to the interference of the metallic body of the keyboard metal chassis 342.

In an embodiment, the NMT plastic molding 350 may also include one or more venting holes formed therein. In this embodiment, the venting holes may be formed at an angle relative to the back side of the display metal cover and the walls so that the heated air may directed away from potentially heat-sensitive devices of the information handling system 300 such as the video/graphics display device 310.

FIG. 3B shows the hinges 358 being used to operatively couple the display housing 346 to the keyboard housing 340 with its keyboard chassis 342 and back keyboard chassis 343. In this configuration the keyboard chassis 342 with the keyboard 360 and touch pad 361 facing upwards may be closed onto the display housing 346 with the video/graphics display device 310 facing downwards. When the information handling system 100 is placed in such a closed position, the video/graphics display device 310 along with the keyboard 360 and touch pad 361 may be protected from damage during transport or non-use of the information handling system 300.

Figure 3C:
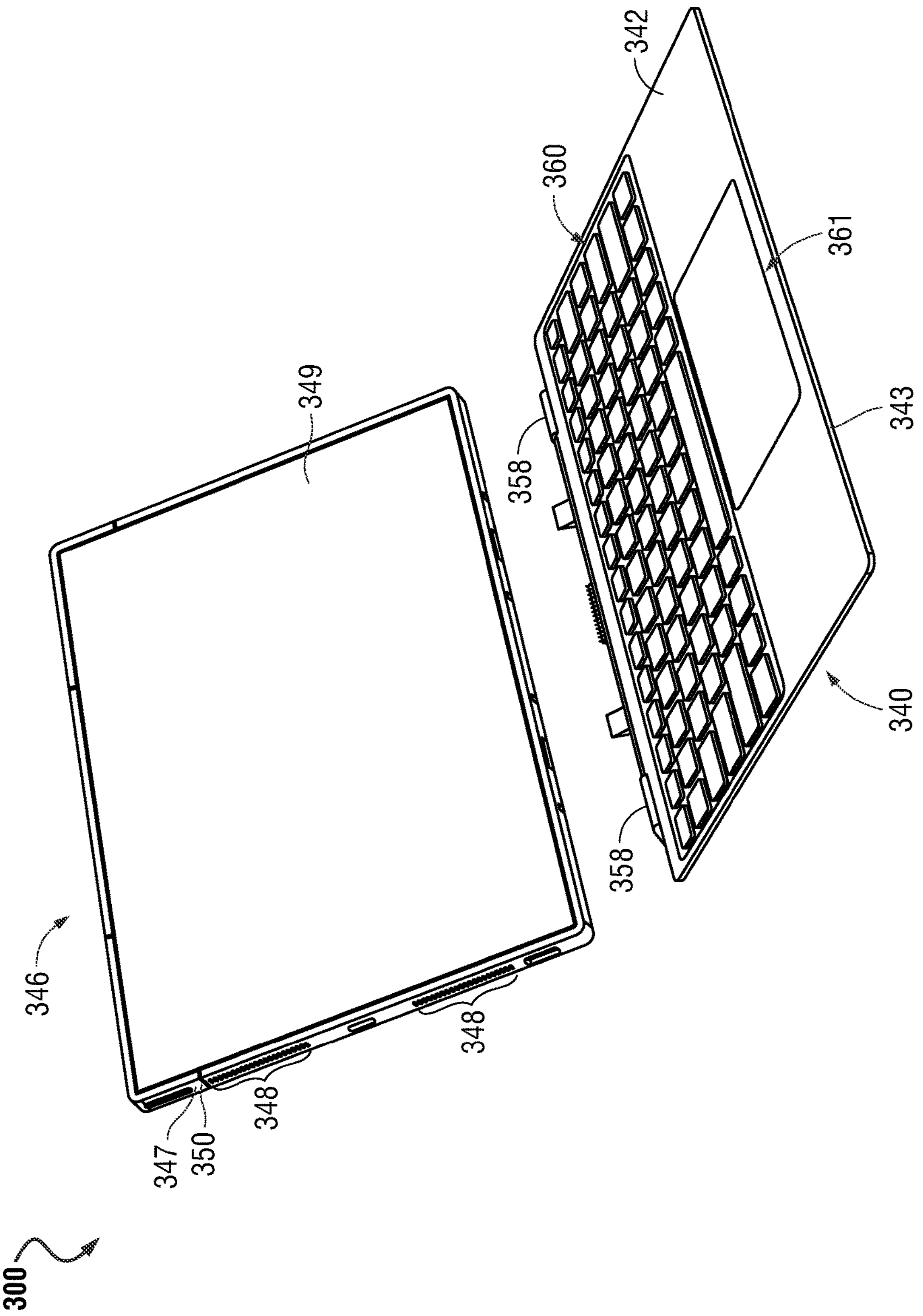
FIG. 3C is a graphical illustration perspective view of an information handling system having a display housing and a keyboard housing placed in a second uncoupled configuration according to an embodiment of the present disclosure.

FIG. 3C is a graphical illustration perspective view of an information handling system 300 having a display housing 346 and a keyboard housing 340 placed in a second uncoupled configuration according to an embodiment of the present disclosure. In this embodiment, the decoupled configuration of the keyboard housing 340 relative to the display housing 346 show the imminent coupling of the keyboard housing 340 to the display housing 346. Again, the information handling system 300 may include the monopole antennas 348 formed in the side walls 347 of the display back metal chassis as described herein and may be formed as described.

Figure 3D:
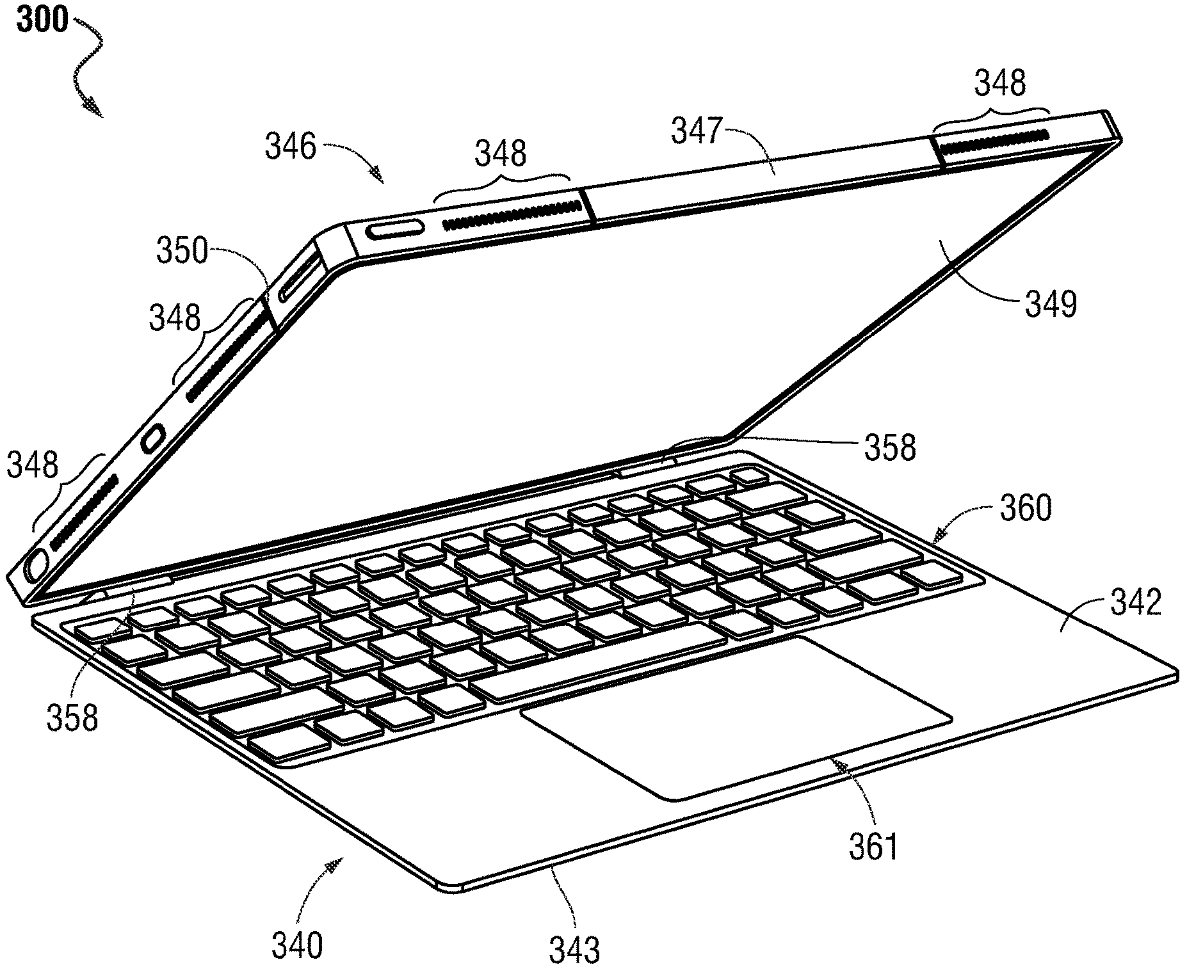
FIG. 3D is a graphical illustration perspective view of an information handling system having a display housing and a keyboard housing placed in a second coupled and semi-closed configuration according to an embodiment of the present disclosure.
Figure 3E:
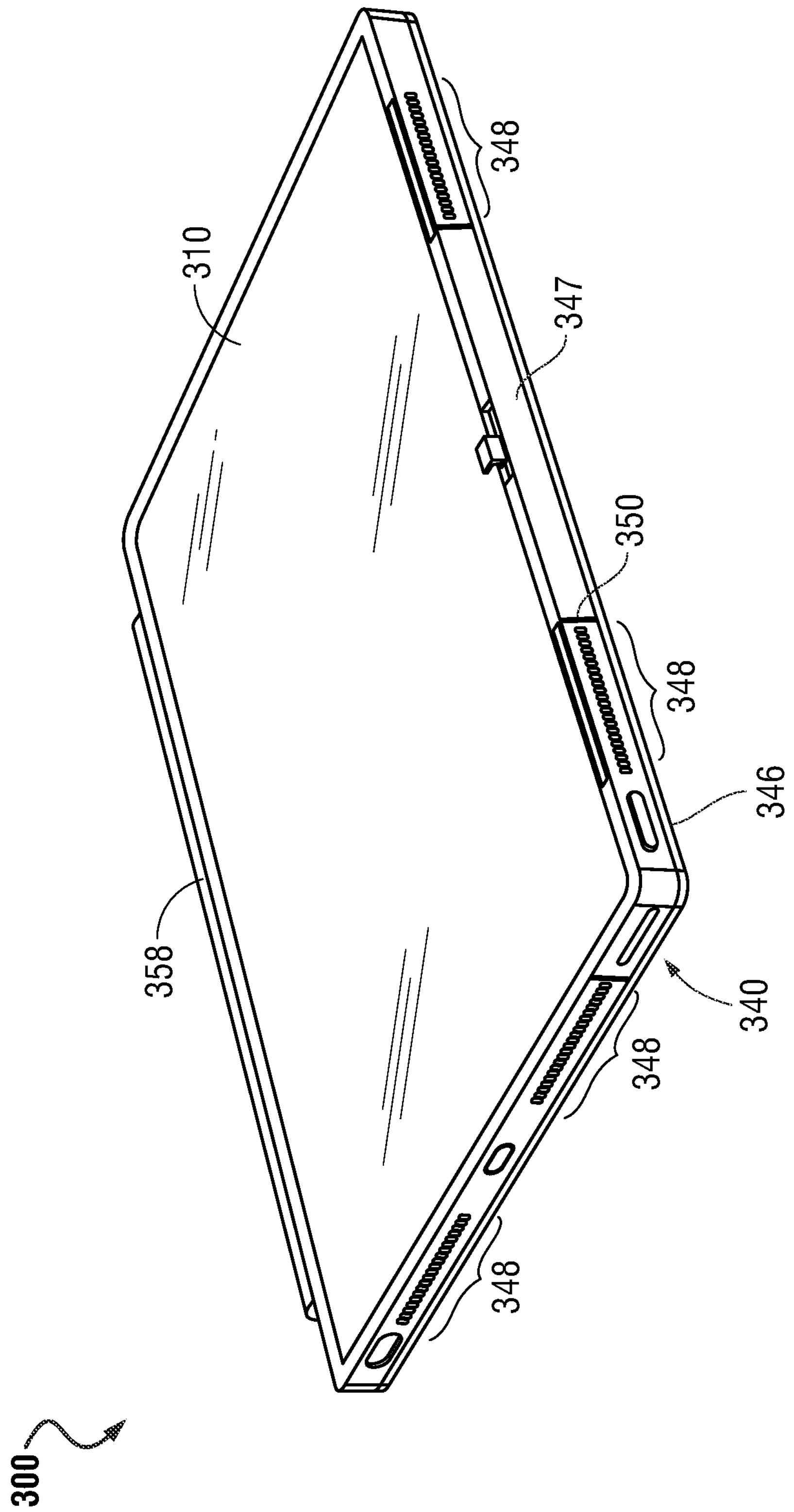
FIG. 3E is a graphical illustration perspective view of an information handling system having a display housing and a keyboard housing placed in a coupled and tablet configuration according to an embodiment of the present disclosure.

As described herein, the information handling system 300 includes one or more monopole antennas 348 formed into the side walls 347 of the display back metal chassis (e.g., 349 in FIGS. 3C and 3D). The side walls 347 where the monopole antennas 348 are formed may, in an embodiment, be used also as a thermal vent to direct heated air in the display housing 346 out of the information handling system 300. In an embodiment, within the display housing 346, a feed PCB (not shown) may be operatively coupled to the monopole antennas 348 to direct an excitation signal or current to the monopole antennas 348. By operatively coupling the feed PCB to the monopole antennas 348, the monopole antennas 348 may operate as antennas by transmitting and receiving RF emissions.

In an embodiment, a monopole antenna 348 may be created using a CNC process to cut the monopole antenna 348 out from a side wall 347 formed along the edges of a display back metal chassis 349 of the display housing 346. In order to hold the monopole antenna 348 to the display housing 346 may include a nano-molded technology (NMT) plastic molding 350 that secures the monopole antenna 348 along the edge of the display back metal chassis (e.g., A-cover) of the display housing 346. As such, the monopole antenna 348 is physically coupled to the display housing 346 via this NMT plastic molding 350. This NMT plastic molding 350 may serve, in addition to physically hold the monopole antenna 348 to the display housing 346, as an isolation barrier to prevent any metals associated with, for example, a keyboard housing 340 that includes a keyboard metal chassis 342 (e.g., a C-cover) and a back keyboard chassis 343 (e.g., a D-cover) that is placed against the display housing 346 in certain configurations as described herein. This NMT plastic molding 350 may act as an antenna keep out so that the transmission of RF signals from the monopole antenna 348 may not be subjected to the interference of the metallic body of the keyboard metal chassis 342.

In an embodiment, the NMT plastic molding 350 may also include one or more venting holes formed therein. In this embodiment, the venting holes may be formed at an angle relative to the back side of the display metal cover and the walls so that the heated air may directed away from potentially heat-sensitive devices of the information handling system 300 such as the video/graphics display device 310.

FIG. 3C shows that the display housing 346 may be operatively coupled to the keyboard housing 340 with the display housing 346 in a reverse configuration than that shown in FIG. 3A. However, FIG. 3C shows specifically that the display housing 346 is not coupled to the keyboard housing 340 via the hinges 358. However, the display housing 346 and keyboard housing 340 may be operatively coupled to each other via these hinges 358. This configuration allows the information handling system 300 to be placed in an easel configuration or, when the display back metal chassis is laid against the keyboard 360 and touch pad 361 of the keyboard chassis 342, in a modified tablet configuration. This modified tablet configuration is shown specifically in FIG. 3E where the display back metal chassis 349 of the display housing 346 abuts against the keyboard chassis 342 and its keyboard 360 and touch pad 361.

By way of example, FIG. 3D is a graphical illustration perspective view of the information handling system 300 placed in a second coupled and semi-closed configuration according to an embodiment of the present disclosure. In this embodiment, by placing the keyboard housing 340 at an angle relative to the display housing 346, the display device (not shown) may be viewable by the user with the keyboard 360 or touch pad 361 being placed in an inoperable state. In this embodiment, the display back metal chassis 349 may be facing the keyboard 360 and touch pad 361 of the keyboard chassis 342 of the keyboard housing 340. Additionally, the configuration of the images on the video/graphics display device 310 may be rotated as necessary for the user to view those images.

In this embodiment of FIG. 3D, the hinges 358 may operatively couple the display housing 346 to the keyboard housing 340. In this embodiment, the hinges 358 may allow the user to selectively alter the angle of the display housing 346 relative to the keyboard housing 340. This may be done to allow further customization of the configuration information handling system 300 while placed in this easel configuration.

Similar to FIGS. 3A through 3C, the information handling system 300, as shown in FIG. 3D, includes one or more monopole antennas 348 formed into the side walls 347 of the display back metal chassis (e.g., 349 in FIGS. 3C and 3D). The side walls 347 where the monopole antennas 348 are formed may, in an embodiment, be used also as a thermal vent to direct heated air in the display housing 346 out of the information handling system 300. In an embodiment, within the display housing 346, a feed PCB (not shown) may be operatively coupled to the monopole antennas 348 to direct an excitation signal or current to the monopole antennas 348. By operatively coupling the feed PCB to the monopole antennas 348, the monopole antennas 348 may operate as antennas by transmitting and receiving RF emissions.

In an embodiment, a monopole antenna 348 may be created using a CNC process to cut the monopole antenna 348 out from a side wall 347 formed along the edges of a display back metal chassis 349 of the display housing 346. In order to hold the monopole antenna 348 to the display housing 346 may include a nano-molded technology (NMT) plastic molding 350 that secures the monopole antenna 348 along the edge of the display back metal chassis (e.g., A-cover) of the display housing 346. As such, the monopole antenna 348 is physically coupled to the display housing 346 via this NMT plastic molding 350. This NMT plastic molding 350 may serve, in addition to physically hold the monopole antenna 348 to the display housing 346, as an isolation barrier to prevent any metals associated with, for example, a keyboard housing 340 that includes a keyboard metal chassis 342 (e.g., a C-cover) and a back keyboard chassis 343 (e.g., a D-cover) that is placed against the display housing 346 in certain configurations as described herein. This NMT plastic molding 350 may act as an antenna keep out so that the transmission of RF signals from the monopole antenna 348 may not be subjected to the interference of the metallic body of the keyboard metal chassis 342.

In an embodiment, the NMT plastic molding 350 may also include one or more venting holes formed therein. In this embodiment, the venting holes may be formed at an angle relative to the back side of the display metal cover and the walls so that the heated air may directed away from potentially heat-sensitive devices of the information handling system 300 such as the video/graphics display device 310.

FIG. 3E is a graphical illustration perspective view of an information handling system 300 having a display housing 346 and a keyboard housing 340 placed in a coupled and tablet configuration according to an embodiment of the present disclosure. In this configuration, the display back metal chassis (e.g., 349 as seen in FIG. 3D) is laid against the keyboard chassis (e.g., 342 in FIG. 3D) so that the keyboard housing 340 and display housing 346 are generally parallel to each other. This prevents the use of the keyboard 360 and touch pad 361, and the processor of the information handling system 300 may detect such orientation and disable input from these devices and receive input from the video/graphics display device 310 which may be in the form of a touch screen device. Additionally, the display housing 346 and the keyboard housing 340 may be operatively coupled to each other via the hinge 358 or a series of hinges 358.

Like FIGS. 3A through 3D, the information handling system 300 of FIG. 3E includes one or more monopole antennas 348 formed into the side walls 347 of the display back metal chassis (e.g., 349 in FIGS. 3C and 3D). The side walls 347 where the monopole antennas 348 are formed may, in an embodiment, be used also as a thermal vent to direct heated air in the display housing 346 out of the information handling system 300 via holes, slits, or openings in the monopole antennas 348 or adjacent to the monopole antennas 348, such as in an NMT plastic molding keep out structure. In an embodiment, within the display housing 346, a feed PCB (not shown) may be operatively coupled to the monopole antennas 348 to direct an excitation signal or current to the monopole antennas 348. By operatively coupling the feed PCB to the monopole antennas 348, the monopole antennas 348 may operate as antennas by transmitting and receiving RF emissions.

In an embodiment of FIG. 3A-3E, a monopole antenna 348 may be created using a CNC process to cut the monopole antenna 348 out from a side wall 347 formed along the edges of a display back metal chassis 349 of the display housing 346. In order to hold the monopole antenna 348 to the display housing 346 may include a nano-molded technology (NMT) plastic molding 350 that secures the monopole antenna 348 along the edge of the display back metal chassis (e.g., A-cover) of the display housing 346. As such, the monopole antenna 348 is physically coupled to the display housing 346 via this NMT plastic molding 350. In an embodiment the NMT plastic molding 350 may surround the monopole antennas 348. This NMT plastic molding 350 may serve, in addition to physically hold the monopole antenna 348 to the display housing 346, as an isolation barrier to prevent any metals associated with, for example, the display housing 346 or a keyboard housing 340 from interfering with the operation of the monopole antenna 348 and the RF emissions thereof. In an embodiment, the keyboard housing 340 that includes a keyboard metal chassis 342 (e.g., a C-cover) and a back keyboard chassis 343 (e.g., a D-cover) that is placed against the display housing 346 in certain configurations and the NMT plastic molding 350 serves as an isolation barrier to that hardware. This NMT plastic molding 350 may act as an antenna keep out so that the transmission of RF signals from the monopole antenna 348 may not be subjected to the interference of the metallic body of either the display housing 346 or the keyboard metal chassis 342.

In an embodiment, the NMT plastic molding 350 may also include one or more venting holes formed therein. In this embodiment, the venting holes may be formed at an angle relative to the back side of the display metal cover and the walls so that the heated air may directed out of the information handling system 300 and away from potentially heat-sensitive devices of the information handling system 300 such as the video/graphics display device 310.

In another embodiment, one or more venting holes may also be formed through the monopole antenna 348. In an embodiment, these venting holes formed in the monopole antenna 348 may serve as the only holes through which the heated air within the information handling system 300 may be passed out of the information handling system 300. Alternatively, the venting holes formed in the monopole antenna 348 may be in addition to the venting holes formed in the NMT plastic molding 350 so that more significant amounts of heated air may be passed out of the information handling system 300.

In order to pass the heated air out of the interior of the information handling system 300, and more specifically, the display housing 346, the information handling system 300 may include an active thermal control system such as a blower or a dual opposite outlet blower system. The blower or dual opposite outlet blower system may pass heated air out of the information handling system from two thermal vents including one or more holes defined at each of the antennas 348 and/or one or more venting holes formed in the NMT plastic molding 350 along or around antennas 348. The blower or dual opposite outlet blower system may direct heat out of opposite walls formed along the edges of the back side of the display housing 346. As such, in an embodiment, each of these opposite walls on the display housing 346 may each include both the NMT plastic molding 350 and the monopole antenna 348. Indeed, in an embodiment, each of the four walls formed along the edges of a back side of the display housing 346 may include a monopole antenna 348 and NMT plastic molding 350 such that a ring of monopole antennas 348 may be formed around the entire circumference of the display housing 346 such as along sidewalls 347. These monopole antennas 348 may each be formed, by length for example, to emit a specific RF or range of RFs to increase the types and numbers of wireless networks to communicatively couple the wireless interface adapter and information handling system 300, generally. Again, each of these monopole antennas 348 may be operatively coupled to a tunable capacitor to dynamically tune these monopole antennas 348 to a specific RF or range of RFs.

In an embodiment, the monopole antenna 348 may be operatively coupled to the wireless interface adapter with an excitation source, processor, and a feed PCB. In an embodiment, a coupling arm (not shown) may be used as a grounding source. The coupling arm may form a capacitive coupling with the antenna 348. In an embodiment, a feed excitation trace or a portion of the walls of the display housing 346 may serve as an excitation point to transmit an excitation signal from the wireless interface adapter, processor, and a feed PCB to the monopole antenna 348 so that the monopole antenna 348 may transceive data. The coupling arm may be operatively coupled to a grounding source so that the metal of the back side of the display housing 346 does not interfere with the operation of the monopole antenna 348.

In an embodiment, the display housing 346 and its monopole antennas 348 may include a parasitic coupling element (not shown). In this embodiment, the parasitic coupling element may be used to selectively change the RF emitted from the monopole antenna 348 so that the range of RF emitted by the monopole antenna 348 may be increased. Additionally, or alternatively, the monopole antenna 348 may be operatively coupled to a tunable capacitor (not shown) that enables the monopole antenna 348 to emit RFs that include those RFs associated with any 4G or 5G, WLAN licensed or unlicensed RFs or other protocols as described herein.

Figure 4:
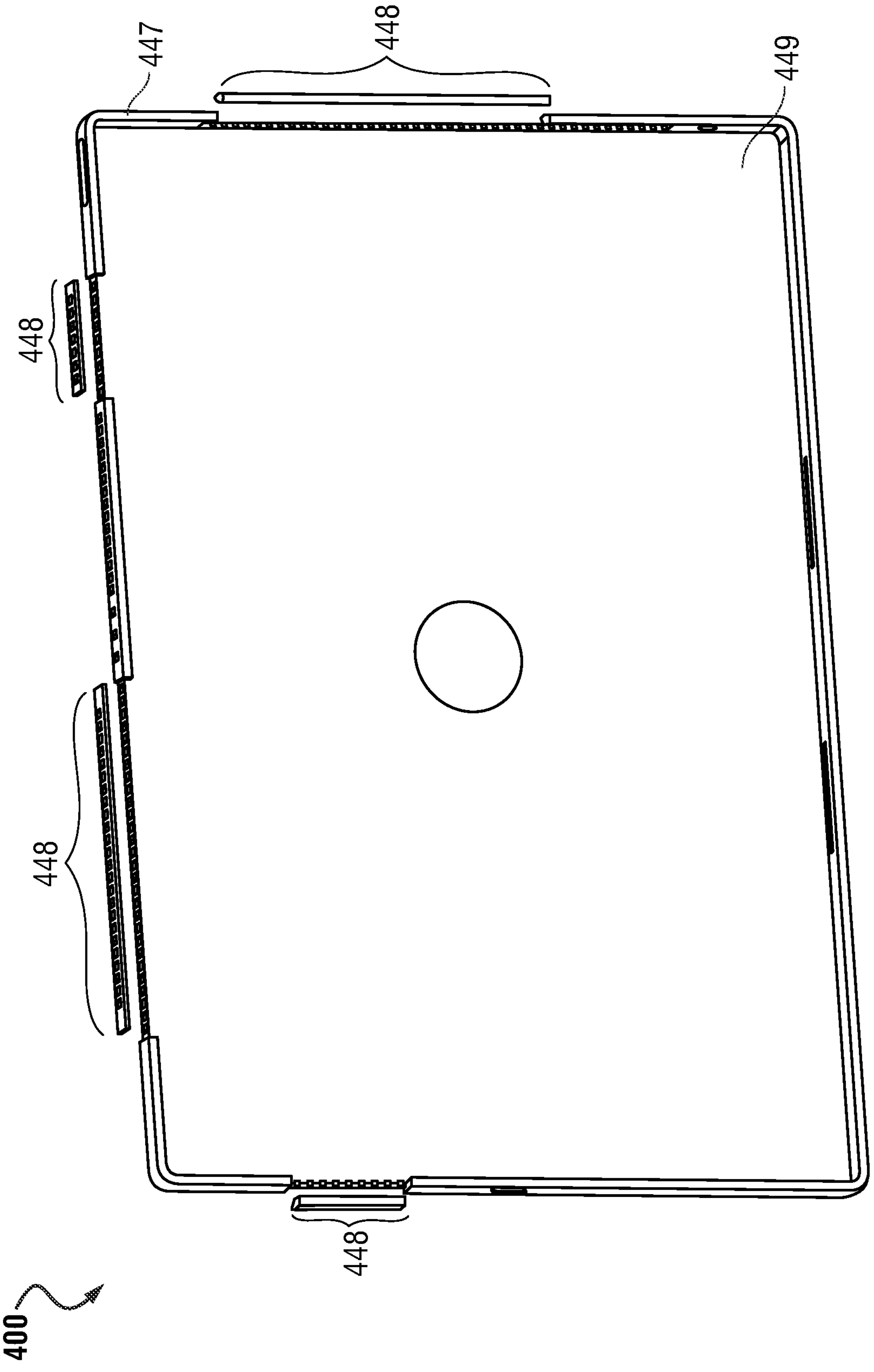
FIG. 4 is a graphical illustration perspective view of a back display housing having a plurality of antennas formed along a wall of the display housing in a ring configuration according to an embodiment of the present disclosure.

FIG. 4 is a graphical illustration perspective view of a back metal chassis 449 of a display housing having an exploded view of a plurality of antennas 448 formed along one or more side walls 447 of the display housing in a ring configuration according to an embodiment of the present disclosure. As described herein, the antennas 448 may be monopole antennas 448 that emit a specific frequency or range of frequencies based on the length of the monopole antennas 448.

In an embodiment, the monopole antenna 448 may be formed by cutting a portion of the side wall 447 away using a CNC process to form the monopole antenna 448. By cutting away the monopole antenna 448, the monopole antenna 448 may be secured to the display housing or, specifically, the back metal chassis 449 using a NMT plastic molding securing the monopole antenna 448 to the display housing 449 while isolating it from the metal chassis 449. This CNC design process allows the monopole antennas 448 to overlap a grounded part (e.g., the grounding source associated with the coupling arm described herein). This allows for the formation of a capacitively coupled aperture seamlessly integrated and/or concealed into the band of sidewalls 447 thereby effectively utilizing the space occupied by the monopole antenna 448 within the information handling system. The aperture may be used as a heat vent or an audio speaker vent along with a monopole antenna 448 in some embodiments.

As described herein, the placement of any given monopole antenna 448 along the side walls 447 may be selected based on the RF bands to be emitted or received by the monopole antenna 448. For example, where the RFs are of a specific frequency that are relatively more susceptible to interference via objects such as a desk or a user's body, the monopole antenna 448 may be placed at a side wall 447 of the back metal chassis 449 that is away from where a user's body may be during use of the information handling system. Other considerations may be addressed in order to determine a specific placement of each of the monopole antennas 448 and the present specification contemplates these other considerations.

Figure 5:
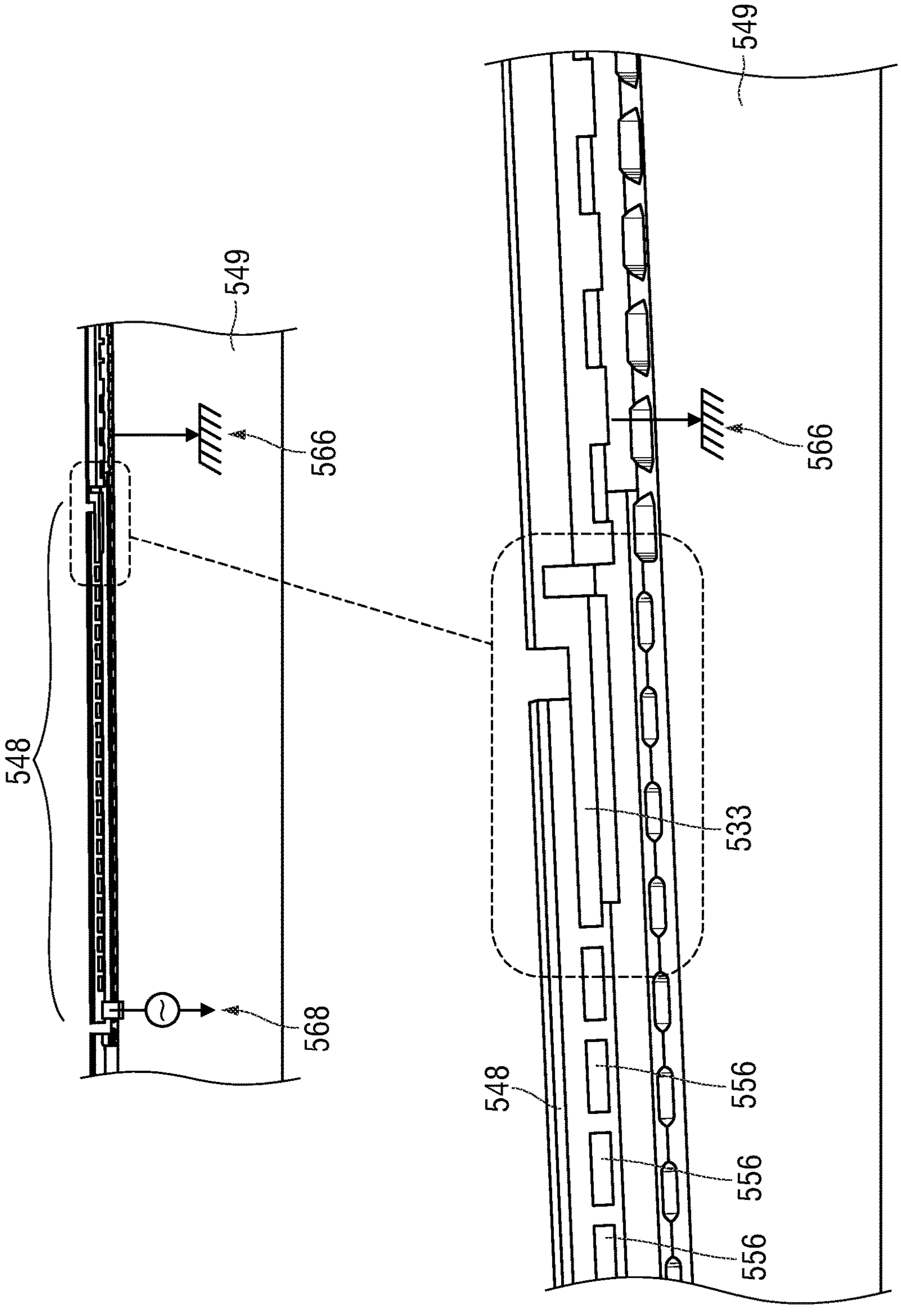
FIG. 5 is a graphical illustration partial perspective view of an antenna formed in a wall of the display housing to facilitate the transmission of a radio frequency (RF) signal according to an embodiment of the present disclosure.

FIG. 5 is a graphical illustration perspective view of an antenna 548 formed in a wall of the back metal chassis 549 of the display housing described herein to facilitate the transmission of a radio frequency (RF) signal according to an embodiment of the present disclosure. FIG. 5 shows two images: a first showing an entire length of an antenna 548 having a window that includes a section of the antenna 548 that is magnified in a second image below the first.

The antenna 548 may include an excitation source 568, such as a radio oscillator or signal generator of a radio front end. The excitation source 568 may provide any signal or electrical current that causes the antenna 548 to resonate at a specific RF. In an embodiment, a portion of a feed PCB within the back metal chassis 549 of the display housing described herein may be operatively coupled to the antenna 548 to transmit that excitation signal. At an opposite location along the antenna 548, a coupling arm 533 may be used to create an additional resonant frequency via its coupling to the antenna 548. The coupling arm 533 may be grounded at a grounding source 566 such as a grounding wall of the back metal chassis. The antenna 548, in this way, uses capacitive coupling to create these additional resonant frequencies in order to increase the overall RF range of the antennas 548 formed in the information handling system. This allows the CNC design processes as described herein to allow the antenna 548 to overlap the coupling arm 533 thereby forming a capacitively coupled aperture that is seamlessly integrated and/or concealed into the side walls of the back metal chassis 549. By providing a CNC formed coupling arm 533 from or as part of a side wall of back metal chassis 549, additional manufacturing steps may be avoided in forming a coupling arm for providing a ground and designated monopole antenna 548 configuration integrated into the back metal chassis 549. As described herein, source the excitation 568 may be operatively coupled via the feed PCB and a connector to the monopole antenna 548. By operatively coupling the feed PCB to the monopole antenna 548, the monopole antenna 548 may operate as an antenna by transmitting and receiving RF emissions. The feed PCB may be operatively coupled to a wireless interface adapter and a front end that is integrated with a main board of the information handling system or integrated with another wireless network interface capability, or any combination thereof and may be used to generate a signal of excitation source 568. In these embodiments, the processor of the information handling system may execute code to send signals to the wireless interface adapter. The wireless interface adapter controls the operation of the antenna systems, RF systems, antenna adaptation controller, and antenna front end as described herein in order to direct an excitation signal be sent from the antenna front end to the monopole antenna 548 in order to transmit and receive data over a network.

As described herein, the antenna 548 may be located at a thermal vent or may, in some embodiments, be dual-purposed as a thermal vent. In order to allow heated air from within the information handling system, the antenna 548 may include one or more venting holes 556 formed therein. The venting holes 556 may be formed using the CNC design processes as described herein. Although these venting holes 556 may not interfere with the transmission of heated air out of the information handling system, the venting holes 556 may be large enough to allow a sufficient amount of heated air to be passed out of the interior of the venting holes 556. In an embodiment, the placement of these venting holes 556 and/or antenna 548 may be selected based on the placement of blower system such as a dual opposite outlet blower system within the information handling system used to blow heated air out of the information handling system. The dual opposite outlet blower system (not shown) may pass heated air out of the information handling system from two thermal vents including one or more holes defined at each of the antennas and/or one or more venting holes formed in the NMT plastic molding as described in the embodiments herein. The dual opposite outlet blower system may direct heat out of opposite walls formed along the edges of the back metal chassis 549 of the display housing. As such, in an embodiment, each of these opposite side walls on the display housing may each include both the NMT plastic molding and the monopole antenna 548. In other embodiments, an audio speaker vent or aperture may be placed at the location of the monopole antenna such that the venting holes formed in the NMT plastic molding allows the audio from the audio speaker may be transmitted out of these holes. In other embodiments presented herein, the antenna adaptation controller may execute instructions as disclosed herein to adjust, via a parasitic coupling element, change the directionality and/or pattern of the emitted RF signals from the antenna system. In this embodiment, the parasitic coupling element may be used to selectively change the RF emitted from the monopole antenna 548 so that the range of RF emitted by the monopole antenna 548 may be increased. Additionally, or alternatively, the monopole antenna 548 may be operatively coupled to a tunable capacitor that enables the monopole antenna 548 to emit RFs that include those RFs associated with any 4G or 5G, licensed or unlicensed RFs.

Figure 6:
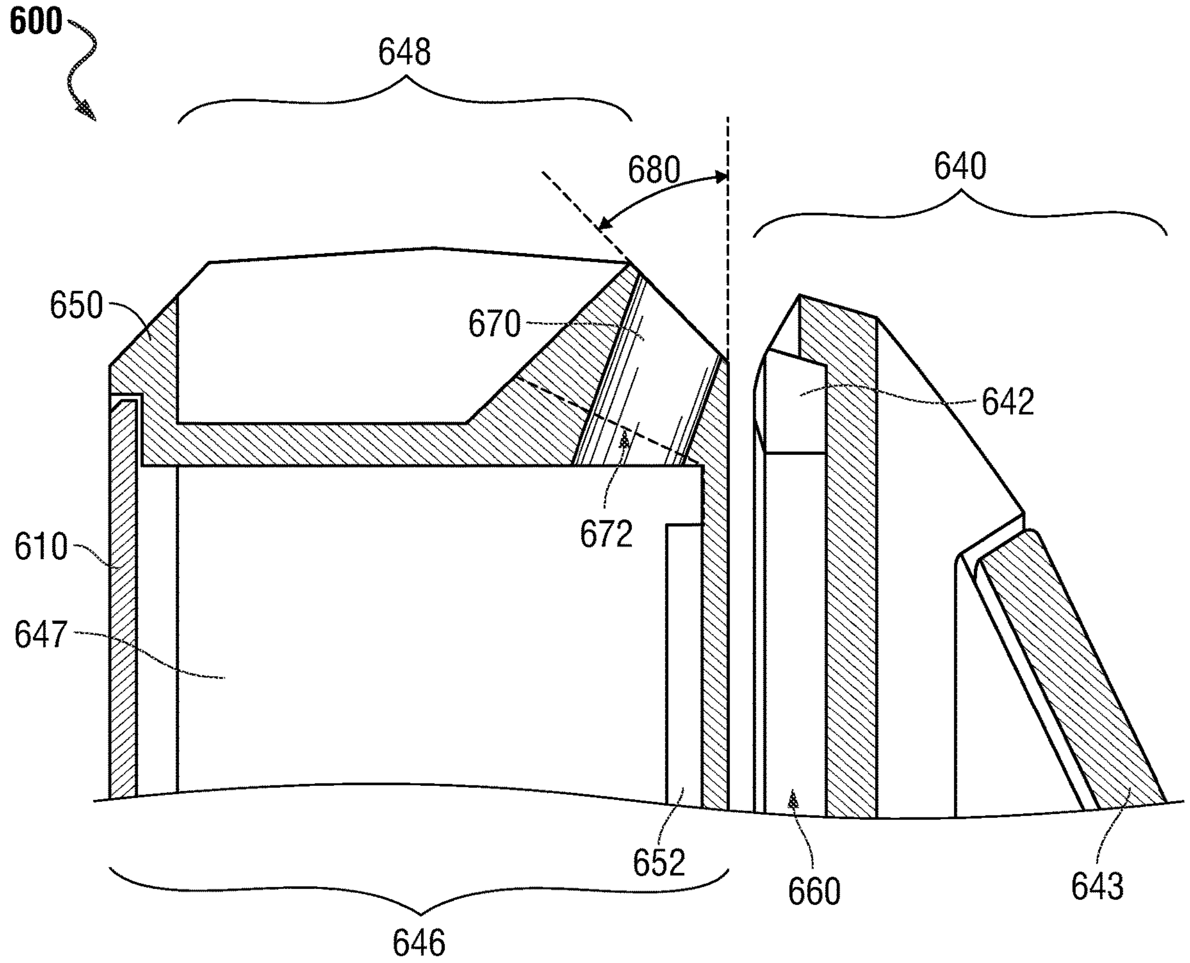
FIG. 6 is a graphical illustration side, cross-cut view of an antenna and a thermal vent formed in the display housing to facilitate the transmission of a radio frequency (RF) signal and vent heated air according to another embodiment of the present disclosure.

FIG. 6 is a graphical illustration side, cross-cut view of an antenna 648 and a thermal or audio vent 670 formed in the display housing 646 to facilitate the transmission of a radio frequency (RF) signal and venting of heated air or an audio signal according to another embodiment of the present disclosure. As described herein, the information handling system 600 may include the display housing 646 along with the keyboard housing 640 that are selectively operatively couplable together via one or more hinges (not shown). In FIG. 6, the edges of the display housing 646 and keyboard housing 640 opposite to where the hinges are located has been highlighted. In this embodiment, therefore, the antenna 648 may be formed into a side wall 647 of the display housing 646 that is at the top edge of the display housing 646. It is appreciated, however, that these antennas 648 may be formed along any side wall 647 of the display housing 646 and, in an embodiment, one or more antennas 648 may be formed into one or more side walls 647 with each antenna 648 used to emit a specific RF.

As described herein, the display housing 646 may include a video/graphics display device 610. The video/graphics display device 610 may be coupled to the display housing 646. In an embodiment, the video/graphics display device 610 may be coupled to the display back metal chassis using a bezel. In an alternative embodiment and in order to increase the visual size of the video/graphics display device 610, the side walls 647 of the display housing 646 may use an attachment method, such as adhesive, press fit, snap fit, fasteners or other methods to attach the display device 610 to the sidewalls and may include use of the NMT plastic molding 650 described herein to secure the video/graphics display device 610 the display housing 646. In this embodiment, the edges of the display housing 646 may extend to the side walls 647 so as to allow a larger video/graphics display device 610 within a bezel to increase the screen size of the video/graphics display device 610 thereby increasing user satisfaction and aesthetics of the information handling system 600. Further, with a chamfered or angled edge 680 of the NMT plastic molding 650 with vent holes 670 allow for the antenna keep-out to serve as a venting for the chassis of the information handling system without blocking of the venting by the keyboard chassis when in various orientations relative to the display chassis.

As described herein, in order to hold the antenna 648 to the display housing 646, a nano-molded technology (NMT) plastic molding 650 secures the antenna 648 along the edge of the back metal chassis (e.g., A-cover) display housing 646. As such, the antenna 648 is physically coupled to the display housing 646 via this NMT plastic molding 650 which may surround the many antenna 648 in an embodiment. This NMT plastic molding 650 may serve, in addition to physically holding the antenna 648 to the display housing 646, acts as an isolation barrier to prevent any metals associated with a keyboard housing 640 that includes a keyboard metal chassis 642 (e.g., a C-cover) and a back keyboard chassis 643 (e.g., a D-cover) that is placed against the display housing 646 in the configuration as shown in FIG. 6 (e.g., a table configuration) from interfering with the antenna 648. This NMT plastic molding 650 may act as an antenna keep out so that the transmission of RF signals from the antenna 648 may not be subjected to the interference of the metallic body of the display housing 648 or the keyboard metal chassis 642.

In an embodiment, in addition to or without the formation of venting holes formed through the antenna 648, the NMT plastic molding 650 may include one or more venting holes 670. In this embodiment, the venting holes 670 may be formed at an angle relative to the back side of the display housing 646 and the walls so that the heated air or an audio signal may be directed away from the chassis 646. For example, with a heat vent the angle of these holes 670 may direct heated air away from potentially heat-sensitive devices of the information handling system 600 such as the video/graphics display device 610.

As described herein, the keyboard housing 640 includes a keyboard chassis 642 and a back keyboard chassis 643. The keyboard chassis 642 may act as a C-cover as described herein to house a keyboard 660, a touch pad, or other input devices associated with the information handling system 600. The back keyboard chassis 643 may be used to close the keyboard housing 640 together and may be made of a metal so as to increase the aesthetics of the information handling system. In the shown embodiment, the keyboard housing 640 has been detached and re-attached such that the keyboard 660 is facing inward to the back of the display housing 646 in a modified tablet configuration.

In an embodiment, the display housing 646 may include a feed PCB 652. The feed PCB 652, and thus excitation source, is operatively coupled to the monopole antenna 648 via connector such as connector or wire 672 (shown in dotted lines) from the feed PCB 652 to the monopole antenna 648 at an end of the monopole antenna 648 or elsewhere on the antenna. This connector or wire 672 may include, in an embodiment, a portion of the back metal chassis of the display housing 646 that operatively couples the feed PCB 652 to the monopole antenna 648 and may be in a plane different from the cross-section plane shown in FIG. 6.

Figure 7A:
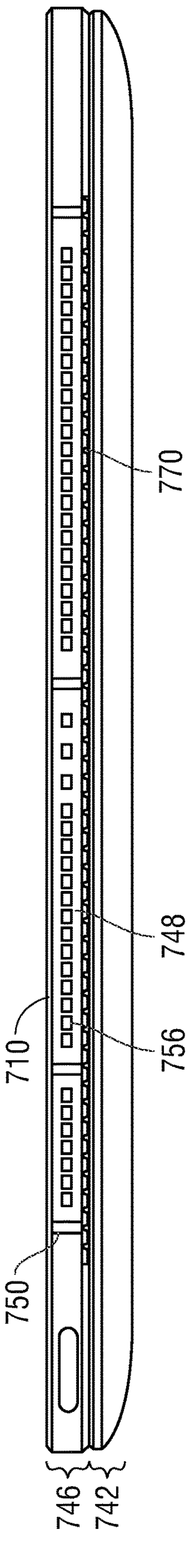
FIG. 7A is a graphical illustration side view of an antenna and vent formed into a wall of the back metal chassis according to an embodiment of the present disclosure.
Figure 7B:
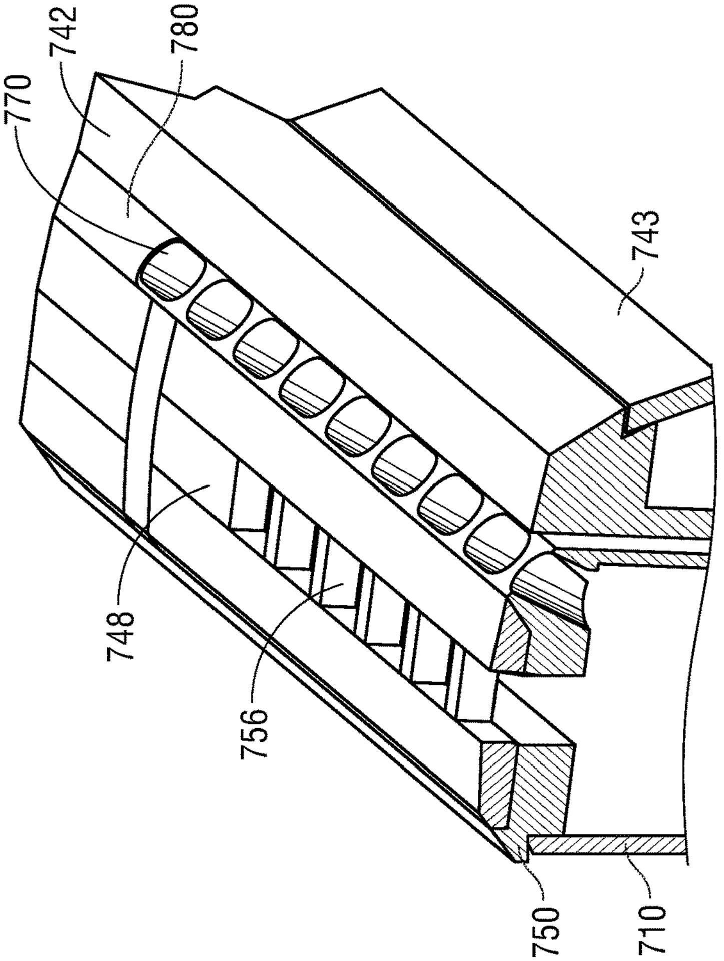
FIG. 7B is a graphical illustration perspective view of an antenna and vent formed into a wall of the back metal chassis according to an embodiment of the present disclosure.

FIG. 7A is a graphical illustration side view of an antenna 748 and vent formed into a sidewall of the back metal chassis of the display housing 746 according to an embodiment of the present disclosure. FIG. 7B is a graphical illustration perspective view of an antenna 748 and vents formed into a sidewall of the display housing 646 according to an embodiment of the present disclosure.

FIGS. 7A and 7B show a close-up view of venting holes 756 formed in the antenna 748 or venting holes 770 formed in the NMT plastic molding 750 according to various embodiments. As described, the venting holes 756, 770 may be formed in the antenna 748, the NMT plastic molding 750, or both. By including more holes via both sets of the venting holes 756, 770, heated air or an audio signal from within the information handling system may be easily dissipated or transmitted. Additionally, better performing processors may be used that create more heat in the information handling system without concerns that the heated air will damage such a processor in some embodiments. In an embodiment, the venting holes 770 of the NMT plastic molding 750 may be formed at an angle relative to the back side of the display metal cover and the walls so that the heated air may directed away from potentially heat-sensitive devices of the information handling system such as the video/graphics display device 710. In an embodiment, the NMT plastic molding 750 may be formed into a chamfered edge to prevent the operative coupling of the antenna to the metal associated with the base metal housing when attached to the display housing. As described herein, the NMT plastic molding 750 with the venting holes 770 may, therefore, act as an antenna keep-out so that the transmission of RF signals from the monopole antenna may not be subjected to the interference of the metallic body of the keyboard metal chassis. Further, with a chamfered or angled edge of the NMT plastic molding 750 with vent holes 770 allow for the antenna keep-out to serve as a venting for the chassis of the information handling system without blocking of the venting by the keyboard chassis when in various orientations relative to the display chassis.

Again, the keyboard housing 740 includes a keyboard chassis 742 and a back keyboard chassis 743. The keyboard chassis 742 may act as a C-cover as described herein to house a keyboard, a touch pad, or other input devices associated with the information handling system. The back keyboard chassis 743 may act as a D-cover and be used to close the keyboard housing 740 together and may be made of a metal so as to increase the aesthetics of the information handling system.

As described herein, the display housing 746 may include a video/graphics display device 710. The video/graphics display device 710 may be coupled to the display housing 746. In an embodiment, the video/graphics display device 710 may be coupled to the display back metal chassis using a bezel. In an alternative embodiment and in order to increase the visual size of the video/graphics display device 710, the side walls of the display housing may use a connector, track or press fit, adhesive, or other method including utilization of the NMT plastic molding 750 described herein to secure the video/graphics display device 710 to the display back metal chassis of the display housing 746 without a bezel. In this embodiment, the edges of the display back metal chassis may extend to the side walls so as to eliminate a bezel and increase the screen size of the video/graphics display device 710 thereby increasing user satisfaction and aesthetics of the information handling system. In the shown embodiment, the keyboard chassis 742 is detachable and reattached such that a keyboard is adjacent to the back portion of the display housing 746 in the keyboard chassis 742.

Figure 7C:
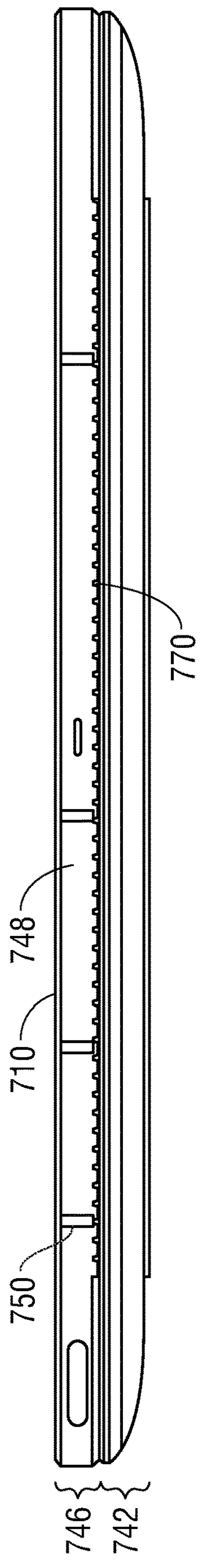
FIG. 7C is a graphical illustration side view of an antenna and vent formed into a wall of the back metal chassis according to another embodiment of the present disclosure.

FIG. 7C is a graphical illustration side view of an antenna 748 and vent formed into a sidewall of the back metal chassis of the display housing 746 according to another embodiment of the present disclosure. The embodiment shown in FIG. 7C may include similar elements as those shown in FIGS. 7A and 7B such as the video/graphics display device 710, venting holes 770 formed through the NMT plastic molding 750, the keyboard chassis 742 and the display housing 746. FIG. 7C shows a tablet configuration where a keyboard of the keyboard chassis 742 is adjacent to the back portion of the display housing 746 in the keyboard chassis 742

FIG. 7C however, shows the embodiment, where the venting holes 770 are only formed in the NMT plastic molding 750 and not through the antenna 748. In this embodiment, the NMT plastic molding 750 venting holes 770 serve as the exit point through which a dual opposite outlet blower system, for example, may expel heated air from within the information handling system. Again, the venting holes 770 may be formed at an angle relative to the back side of the display housing 746 so that the heated air may directed away from potentially heat-sensitive devices of the information handling system such as the video/graphics display device 710. Also, in the embodiments described herein, the venting holes 770 may be implemented as speaker vent holes such that audio signals may be transmitted from a speaker in the information handling system and out of the venting holes 770. Again, in an embodiment, the NMT plastic molding 750 may be formed into a chamfered edge to prevent the operative coupling of the antenna to the metal associated with the base metal housing when attached to the display housing. As described herein, the NMT plastic molding 750 with the venting holes 770 may, therefore, act as an antenna keep-out so that the transmission of RF signals from the monopole antenna may not be subjected to the interference of the metallic body of the keyboard metal chassis. Further, the chamfered or angled edge of the NMT plastic molding 750 with vent holes 770 allow for the antenna keep-out to serve also for venting for the information handling system without the venting holes 770 being blocked the keyboard chassis when in various orientations relative to the display chassis.

Figure 8:
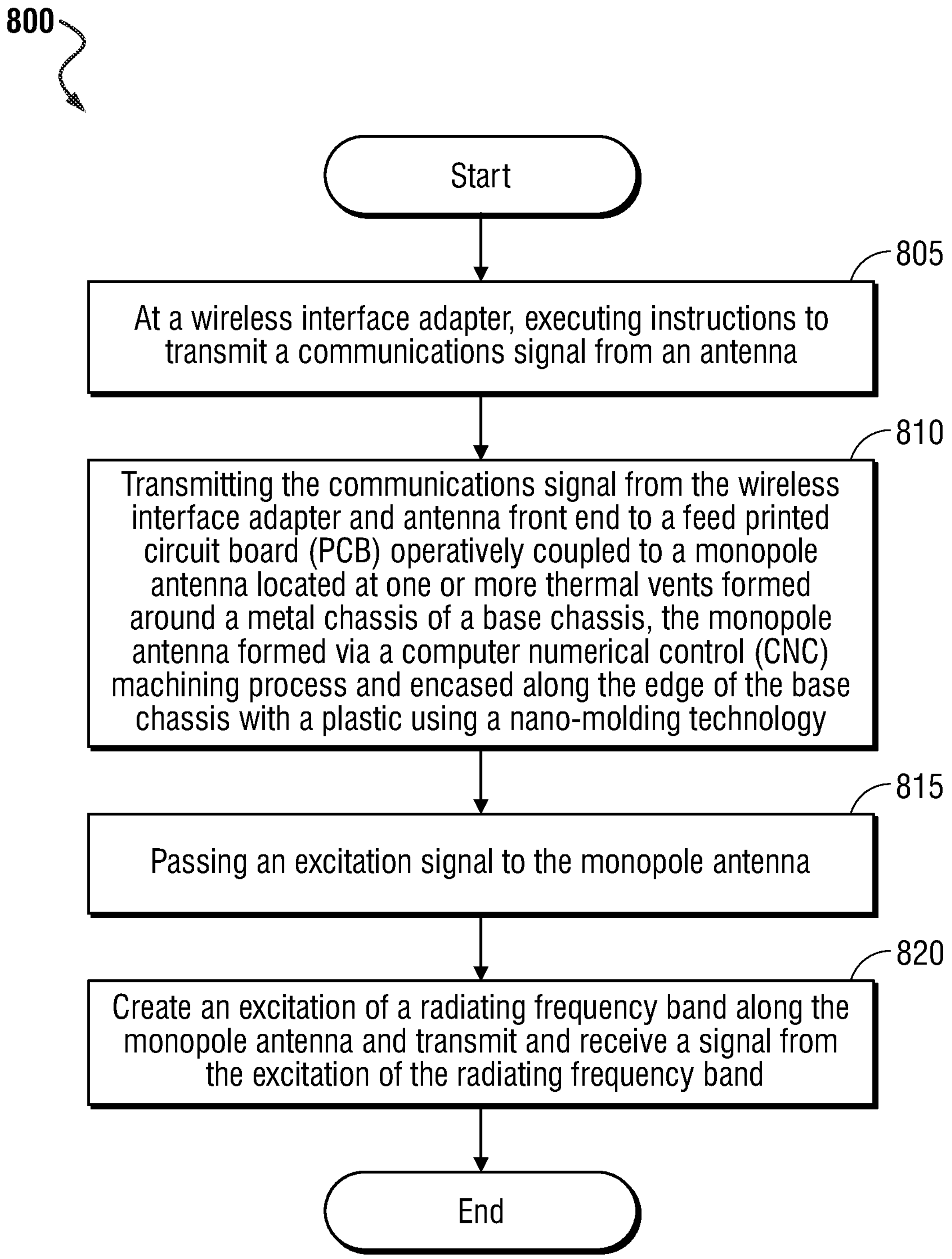
FIG. 8 is a flow diagram illustrating a method for operating an information handling system having an antenna located with a thermal vent according to an embodiment of the present disclosure.

FIG. 8 is a flow diagram illustrating a method 800 for operating an information handling system having an antenna located with a thermal (or audio) vent according to an embodiment of the present disclosure. The method may include, at block 805, executing instructions to transmit a communications signal from an antenna at a wireless interface adapter. These instructions may include instructions to upload or download data from and to the information handling system, respectively. This process may use a processor and a wireless interface adapter with its antenna front end and antenna adaption controller.

The method 800 may further include, at block 810, transmitting the communications signal from a wireless interface adapter and front end to a feed PCB operatively coupled to a monopole antenna located at one or more thermal (or audio) vents formed around a back metal chassis of a display housing, the monopole antenna formed via a computer numerical control (CNC) machining process and encased along the edge of the back metal chassis with a plastic using a nano-molding technology. In an embodiment, the monopole antenna may be created using a CNC process to cut the monopole antenna out from a wall formed along the edges of a back side of the display housing. In order to hold the monopole antenna to the display housing may include a nano-molded technology (NMT) plastic molding that secures the monopole antenna along the edge of the back side (e.g., A-cover) display housing. As such, the monopole antenna is physically coupled to the display housing via this NMT plastic molding. This NMT plastic molding may serve, in addition to physically hold the monopole antenna to the display housing, as an isolation barrier to prevent any metals associated with, for example, the back metal chassis of the display housing or a keyboard housing 140 that includes a keyboard metal chassis (e.g., a C-cover) and a back keyboard chassis (e.g., a D-cover) that is placed against the display housing in certain configurations as described herein from interfering with the operation of the antenna. This NMT plastic molding may act as an antenna keep out so that the transmission of RF signals from the monopole antenna may not be subjected to the interference of the metallic body of the back metal chassis of the display housing or the keyboard metal chassis of the keyboard housing. In an embodiment, the NMT plastic molding may be formed into a chamfered edge to prevent the operative coupling of the antenna to the metal associated with the base metal housing when attached to the display housing. This NMT plastic molding may, therefore, act as an antenna keep-out so that the transmission of RF signals from the monopole antenna may not be subjected to the interference of the metallic body of the keyboard metal chassis.

This CNC design process described herein allows the monopole antennas to be formed to overlap a grounded part (e.g., the grounding source associated with the coupling arm described herein). This allows for the formation of a capacitively coupled aperture seamlessly integrated and/or concealed into the band thereby effectively utilizing the space occupied by the monopole antenna within the information handling system.

The method 800 may further include passing the excitation signal to the monopole antenna at block 815. In an embodiment, the feed PCB may cause the excitation signal to pass across a portion of the display housing to the monopole antenna in the sidewall. In an embodiment, the excitation signal may have been converted to a current at the feed PCB such that excitation of the antenna using that specific current causes the antenna to radiate a specific RF frequency band for a particular wireless protocol utilized by the wireless interface adapter.

At block 820, the method 800 may continue with creating an excitation of a radiating frequency band along the monopole antenna and transmit a wireless signal or receive a wireless signal in communication with an access point or base station. As described herein, the length of the monopole antenna may determine the RF or range of RF that may be emitted by the monopole antenna. In an embodiment, the monopole antenna may be operatively coupled to a tunable capacitor that enables the monopole antenna to emit RFs that include those RFs associated with any 4G or 5G, licensed or unlicensed RFs. The RFs used may allow the information handling system to connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band in example embodiments. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. WWAN may operate in a number of bands, some of which are proprietary but may include a wireless communication frequency band at approximately 2.5 GHz or 5 GHz bands for example. In additional examples, WWAN carrier licensed bands may operate at frequency bands of approximately 700 MHz, 800 MHz, 1900 MHz, or 1700/2100 MHz as well as the NRFR1, NFRF2, bands, and other known bands. In the example embodiment, mobile information handling system 100 includes both unlicensed wireless RF communication capabilities as well as licensed wireless RF communication capabilities. For example, licensed wireless RF communication capabilities may be available via a subscriber carrier wireless service. With the licensed wireless RF communication capability, WWAN RF front end may operate on a licensed WWAN wireless radio with authorization for subscriber access to a wireless service provider on a carrier licensed frequency band.

The method 800 may also include transmitting a signal from the excitation of the radiating frequency band thereby establishing a communication link with a network as described herein. Because the antennas may be formed in a ring configuration along the side walls of the display housing, multiple communication links may be established, even concurrently, so that the functionalities of the information handling system may be increased. At this point, the method 800 may end.

The blocks of flow diagram of FIG. 8 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system to wirelessly transmit and receive data at an antenna comprising:

a processor;

a memory;

a power management unit;

a display housing containing components of the information handling system, the display housing including metal sidewalls formed along edges of a back metal chassis of the display housing and generally perpendicular to the back side;

an antenna formed into a first sidewall of the display housing and nested into the first sidewall within a molded plastic keep-out structure for isolating the antenna from the back metal chassis and metal portions of the first sidewall, and where the antenna formed into the sidewall of the display housing, and nested within the molded plastic keep-out structure to, upon execution of the processor, create radiating radio frequency (RF) bands from the antenna;

the antenna operatively coupled to a feed excitation trace to transmit an excitation current to the antenna from a wireless interface adapter; and the plastic molded keep-out structure integrated along the sidewall to secure the antenna to the first sidewall and isolate the antenna from the metal portions of the first sidewall.

2. The information handling system of claim 1 further comprising:

the plastic molded keep-out structure configured to be an antenna isolation barrier to prevent a keyboard housing from operatively coupling to the antenna to generate interference.

3. The information handling system of claim 1 further comprising:

the antenna having one or more holes formed into the metal of the antenna to allow heated air from a cooling system in the information handling system to exit the display housing.

4. The information handling system of claim 1 further comprising:

a keyboard housing operatively couplable via a hinge to the display housing in an open configuration or a tablet configuration.

5. The information handling system of claim 1 further comprising:

holes defined in the plastic molded keep-out structure with a chamfered edge integrating the antenna into the sidewall to vent heated air from the interior of the information handling system when the information handling system is in any configuration of the display housing relative to a metal keyboard housing.

6. The information handling system of claim 1 further comprising:

a plurality of antennas formed in more than one of the sidewalls in the display housing; and a dual opposite outlet blower system that passes heated air out of the information handling system from two thermal vents defined at each of the plurality of antennas.

7. The information handling system of claim 1 further comprising:

a grounding body formed from a section of the sidewall of the display housing adjacent to the antenna.

8. The information handling system of claim 1 further comprising:

holes defined in the plastic molded keep-out structure, the holes formed at an angle relative to the back side of the display metal cover and the sidewalls.

9. A metallic display housing of an information handling system formed by coupling a back metal chassis with a display screen, the metallic display housing to house:

a processor;

a memory; and a power management unit;

the back metal chassis having a plurality of side-walls and including an antenna formed into a first sidewall of the back metal chassis and nested into plastic modeling in the first sidewall and isolating the antenna from the back metal chassis and metal portions of the plurality of sidewalls, wherein the antenna formed into the sidewall of the display housing nested in plastic molding is configured to, via a wireless interface adapter, create radiating radio frequency (RF) bands;

the antenna operatively coupled to a feed excitation trace to transmit an excitation current to the antenna from the wireless interface adapter;

a coupling arm to form a capacitive coupling with the antenna; and the plastic molding surrounding and isolating the antenna in the sidewall configured to secure the antenna near the coupling arm and to the sidewall while isolating the antenna from metal portions of the sidewall.

10. The metallic keyboard housing of claim 9 further comprising:

the plastic molding in the sidewall configured to be an antenna isolation barrier to prevent a keyboard housing from operatively coupling to the antenna.

11. The metallic keyboard housing of claim 9 further comprising:

one or more holes formed into the antenna to allow heated air from a cooling system in the information handling system to exit the display housing.

12. The metallic keyboard housing of claim 9 further comprising:

one or more holes formed in the plastic molding along the sidewall to vent heated air from the interior of the information handling system, the holes formed at an angle relative to the back side of the display metal cover and the sidewalls to vent heated air when the information handling system is in any configuration of the display housing relative to a metal keyboard housing.

13. The metallic keyboard housing of claim 9 further comprising:

a plurality of antennas formed in more than one of the sidewalls in the display housing; and a dual opposite outlet blower system that passes heated air out of the information handling system from two thermal vents including more than one hole defined at each of the antennas.

14. The metallic keyboard housing of claim 9, wherein the antenna is a monopole antenna and is operatively coupled to a tunable capacitor to dynamically tune the monopole antenna to a frequency.

15. An information handling system to transmit a communication signal comprising:

a display housing containing components of the information handling system including a processor, a memory, and a power management unit, the display housing including a back metal chassis;

a selectively detachable metal keyboard chassis operatively couplable via a hinge;

a plurality of sidewalls formed along the edges of a back side of the display housing and generally perpendicular to the back side;

a ring of two or more antennas formed into two or more sidewalls of the display housing nested in plastic molding surrounding each of the two or more antennas and isolating the two or more antennas from the back metal chassis and metal portions of the plurality of sidewalls, and where the ring of two or more antennas formed into two or more sidewalls of the display housing nested in plastic molding are configured to, via a wireless interface adapter, create radiating radio frequency (RF) bands for wireless communications;

a feed excitation trace to transmit an excitation current to the antenna from the wireless interface adapter;

a coupling arm to form a capacitive coupling with the antenna;

the plastic molding in the sidewall to secure the antenna near the coupling arm and to the sidewall but isolate the antenna from the metal portion of the sidewall; and a thermal vent formed at the two or more antennas to vent from the interior of the display housing.

16. The information handling system of claim 15 further comprising:

an antenna isolation barrier to prevent a metal keyboard housing and the display housing from operatively coupling to the antenna.

17. The information handling system of claim 15 the antenna further comprising:

one or more holes formed into the antenna as a thermal vent to allow heated air from a cooling system in the information handling system to exit the display housing.

18. The information handling system of claim 15 further comprising:

one or more holes formed in the plastic molding around the antenna in the sidewall to vent heated air from the interior of the information handling system, the holes formed at an angle relative to the back side of the display metal cover and the sidewalls to vent the heated air when the information handling system is in any configuration of the display housing relative to a metal keyboard housing.

19. The information handling system of claim 15 further comprising:

a dual opposite outlet blower system that passes heated air out of the information handling system from at least two thermal vents located at two antennas formed into the sidewalls.

20. The information handling system of claim 15, wherein the antennas are monopole antennas and are each operatively coupled to a tunable capacitor to dynamically tune the monopole antennas to a frequency.

* * * * *